United States Patent [19]

Gudmestad et al.

[11] 3,927,590
[45] Dec. 23, 1975

[54] APPARATUS FOR PRODUCING ELECTRICAL CONDUCTORS OF MEASURED LENGTH

[75] Inventors: Ragnar Gudmestad, West Allis; Sven O. Sandblom, Greendale, both of Wis.

[73] Assignee: Artos Engineering Company, New Berlin, Wis.

[22] Filed: Oct. 10, 1974

[21] Appl. No.: 513,937

[52] U.S. Cl. .................. 83/151; 83/277; 83/175; 83/580
[51] Int. Cl.² .................. B26D 7/14; B26D 5/20
[58] Field of Search .............. 83/151, 277, 580, 175

[56] References Cited
UNITED STATES PATENTS

| | | | |
|---|---|---|---|
| 3,029,494 | 4/1962 | Andren | 83/151 UX |
| 3,701,301 | 10/1972 | Gudmestad | 83/151 |

*Primary Examiner*—Willie G. Abercrombie
*Attorney, Agent, or Firm*—James E. Nilles

[57] ABSTRACT

A wire feeding unit and an associated wire length measuring unit advance supply wire through a cutting zone and at the same time the advanced supply wire is guided by a wire transfer system across transversely spaced endless conveyor chains of a wire propelling conveyor. The feeding unit is automatically stopped when it has advanced a measured length of the supply wire and the transfer system tensions the advanced supply wire while it is held against lengthwise displacement by the stopped feeding unit. The wire transfer system then engages the stopped and tensioned wire length with gripping jaws on the conveyor chains, the gripping jaws are closed, and the supply wire is severed in the cutting zone. Tensioning of the advanced supply wire prevents it from sagging between the transversely spaced conveyor gripping jaws and thereby avoids undesirable length variations of the cut off portion of the supply wire.

The mechanism for severing the supply wire in the cutting zone is laterally adjustable to clear the adjacent end of the cut off wire length during subsequent advance movement of the conveyor chains.

9 Claims, 30 Drawing Figures

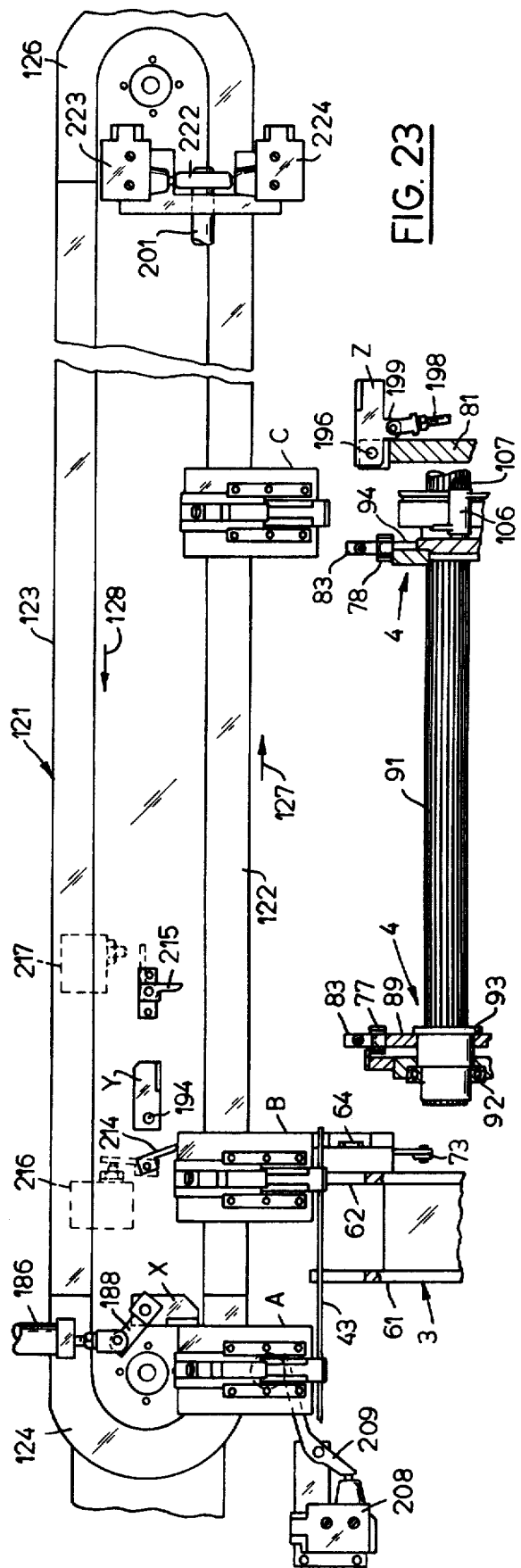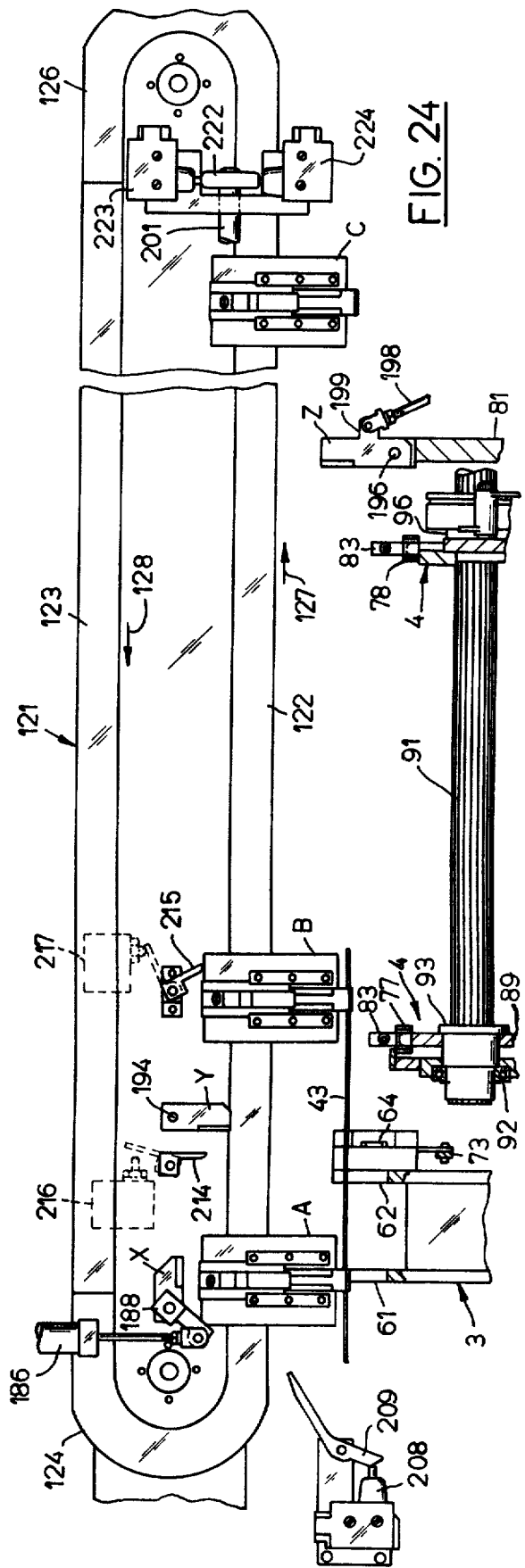

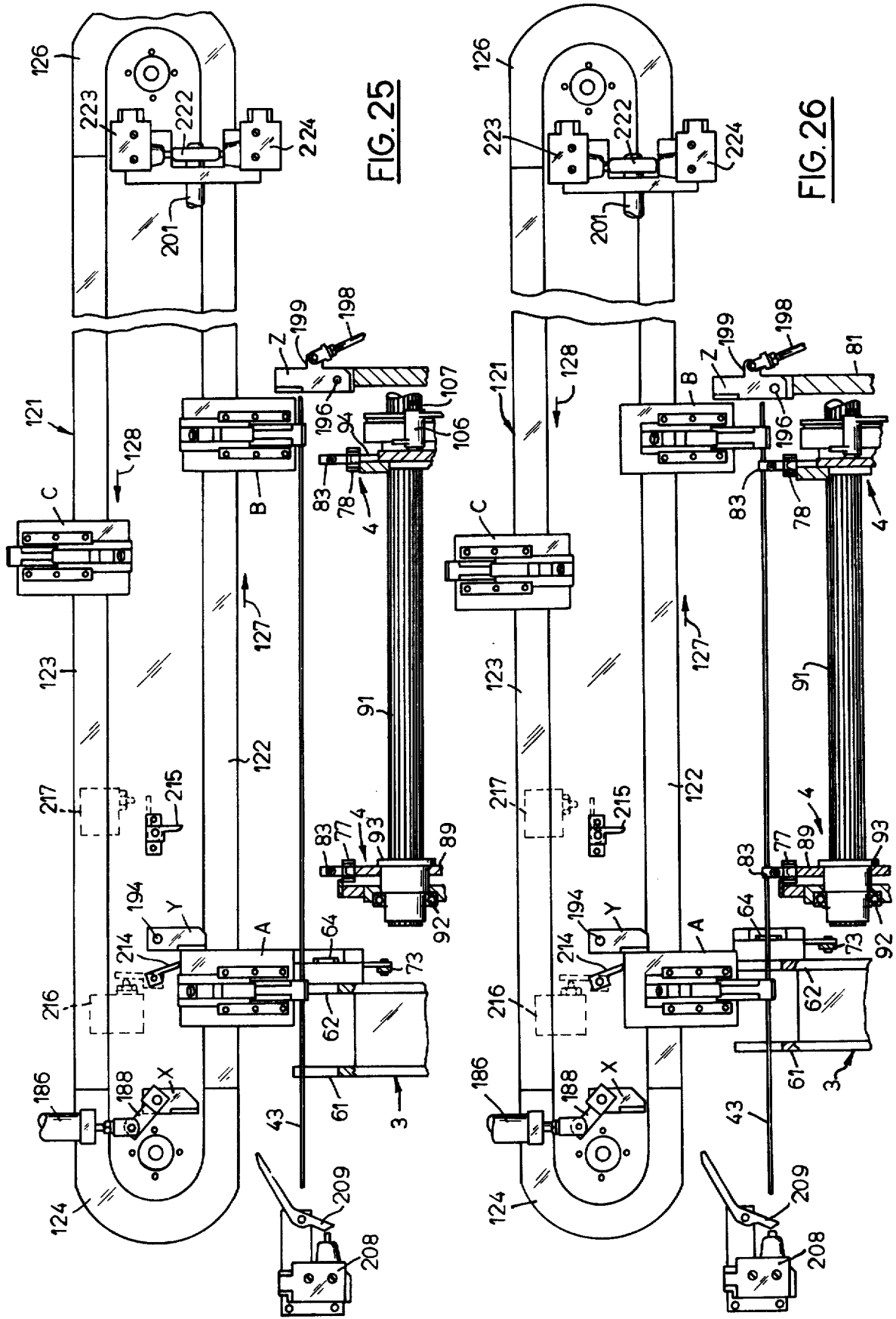

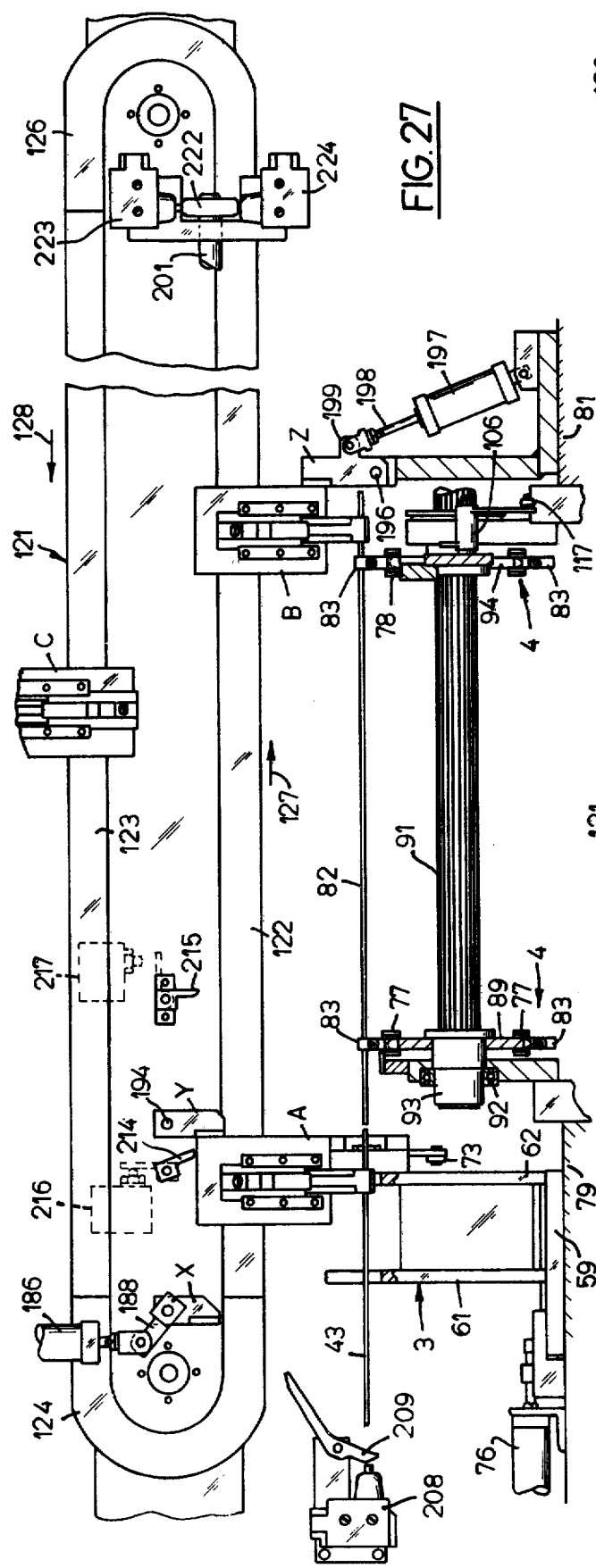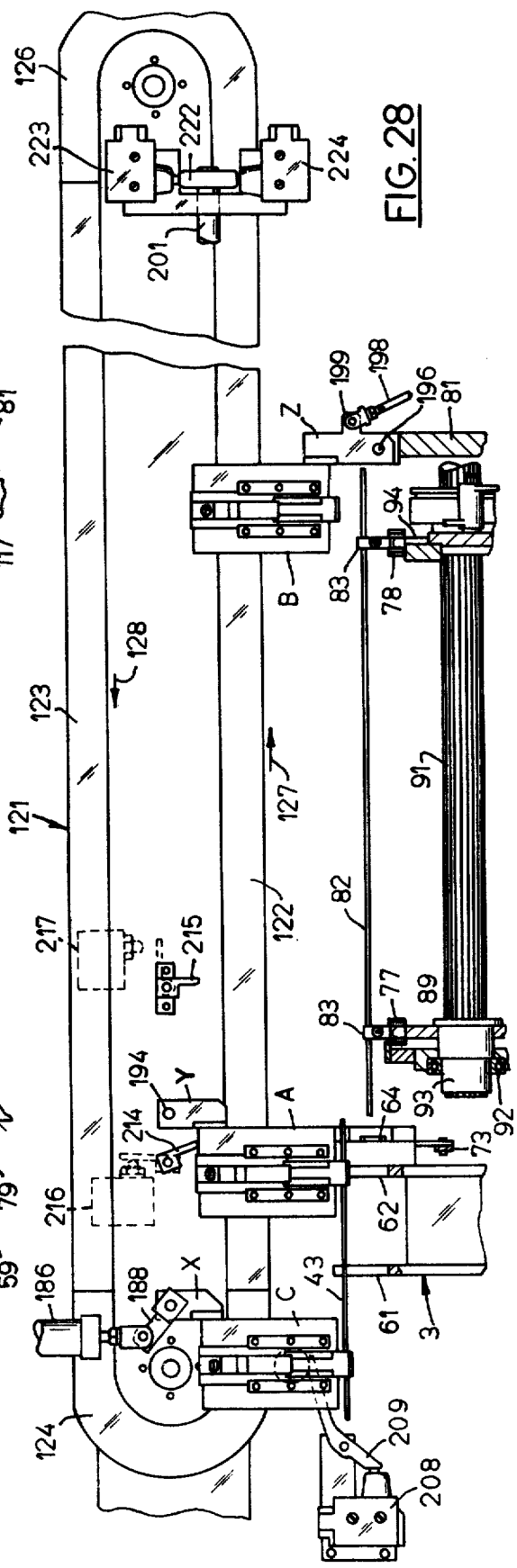

APPARATUS FOR PRODUCING ELECTRICAL CONDUCTORS OF MEASURED LENGTH

BACKGROUND OF THE INVENTION

The invention relates to the production of electrical conductors of measured length and it is concerned more particularly with the cutting of such conductors from a continuous supply wire.

Apparatus for producing electrical conductors from a continuous supply wire have heretofore been developed in which a bench type main frame is provided at one side with a pair of parallel, spaced apart side frames extending transversely of the main frame; in which laterally spaced endless chains of a wire propelling conveyor are mounted, respectively, on the side frames; and in which a wire feeding mechanism and a wire cutting mechanism are mounted on the main frame and are operated in such a manner as to successively cut wire portions of measured length from the supply wire, and place them on the chains of the wire propelling conveyor for step by step sidewise advance movement by the latter away from the main frame. In order to provide for the production of conductors of different lengths, the side frame next to the wire cutting mechanism is rigidly connected to the main frame, and the other side frame is laterally adjustable to fixed positions at different spacings from the fixed side frame.

In prior art apparatus of the above outlined type auxiliary equipment such as insulation stripping units and terminal attaching units are usually mounted on the side frames and perform their functions on the conveyor supported cut wire lengths during intermittent periods of standstill of the conveyor.

In order to feed the wire, as mentioned, across the spaced conveyor chains a pair of counter reciprocating feeding clamps have heretofore been used which function alternately to advance wire stock through a cutting zone; and the cutting mechanism has been operated to sever the advanced length of wire from the stock after each feeding stroke of each feeding clamp. The length of the wire which is thus cut from stock after completion of a clamp feeding stroke is determined, not only by the length of said stroke, but also by the catenary sag which the wire assumes in the space between the conveyor chains before it is cut. If the spacing between the side frames and therefore of the conveyor chains is large and the wire is relatively heavy, the catenary sag of the wire will, of course, be greater than when the spacing between the conveyor chains is short and the wire is relatively light. In other words, the length of the wire which is cut from stock is subject to variation which in cases where extreme accuracy of the cut off wire length is required becomes objectionable.

Also, in apparatus of the mentioned character employing a pair of counter reciprocating wire feeding clamps relatively complicated and expensive mechanisms have been required to precisely time the opening and closing of the feeding clamps and the operation of the wire cutting mechanism so that it will sever the supply wire at the exact moment when a feeding stroke has been completed by one feeding clamp but not before the other feeding clamp has taken hold of the uncut wire. An apparatus which is constructed and operated in the above outlined manner is disclosed in U.S. Pat. No. 3,701,301 issued on Oct. 31, 1972 to Ragnar Gudmestad for Wire Length Measuring and Cutting Apparatus.

SUMMARY OF THE INVENTION

The present invention provides an apparatus for automatically producing electrical conductors from a continuous supply wire in a manner which will avoid the mentioned length variations of the produced conductors due to catenary sagging of the wire. As a result, the length of the produced conductors will be highly accurate irrespective of whether the cut off portion of the supply wire is long or short, and irrespective of whether the supply wire is of light of heavy gauge.

With these ends in view the invention contemplates feeding the supply wire through a cutting zone by pushing it lengthwise toward one side of said zone and simultaneously advancing it by a wire transfer system across parallel, spaced apart conveyor chains at the other side of the cutting zone; stopping the feeding of the wire after a measured length thereof has been advanced across the conveyor chains; tensioning the advanced wire length by operation of the transfer system; clamping the tensioned, measured wire length to the conveyor chains; severing the supply wire in the cutting zone, and indexing the conveyor chains so as to move the tensioned severed length of the supply wire thereon sidewise out of alignment with the remaining portion of the supply wire.

More particularly, the wire transfer system, as contemplated by the invention comprises an endless elongated track overlying the conveyor chains and bridging the space therebetween; a plurality of wire transfer clamps movable in series around the track; a clamp holding gate, a clamp starting gate and a clamp intercepting gate spaced along the track; and actuating mechanisms for the wire transfer clamps and gates operable in timed relation to each other so as to accomplish the tensioning of the advanced length of supply and its transfer to the conveyor chains.

DRAWINGS

The foregoing and other objects and advantages of the invention will become more fully apparent as this specification proceeds with reference to the accompanying drawings in which:

FIGS. 23 through 28 are schematic views illustrating various operating phases of the wire transfer system shown in FIG. 7;

DETAILED DESCRIPTION

Figure 1:
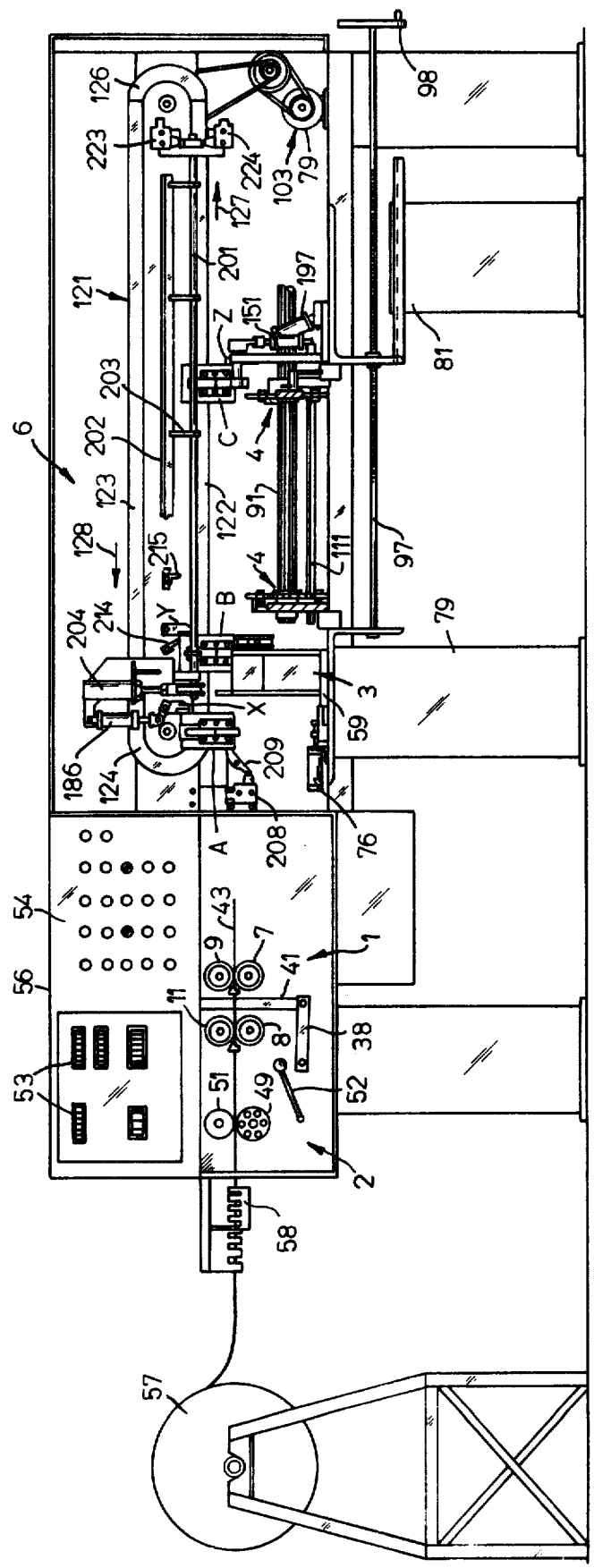
FIG. 1 is a front view of an apparatus embodying the invention.
Figure 2:
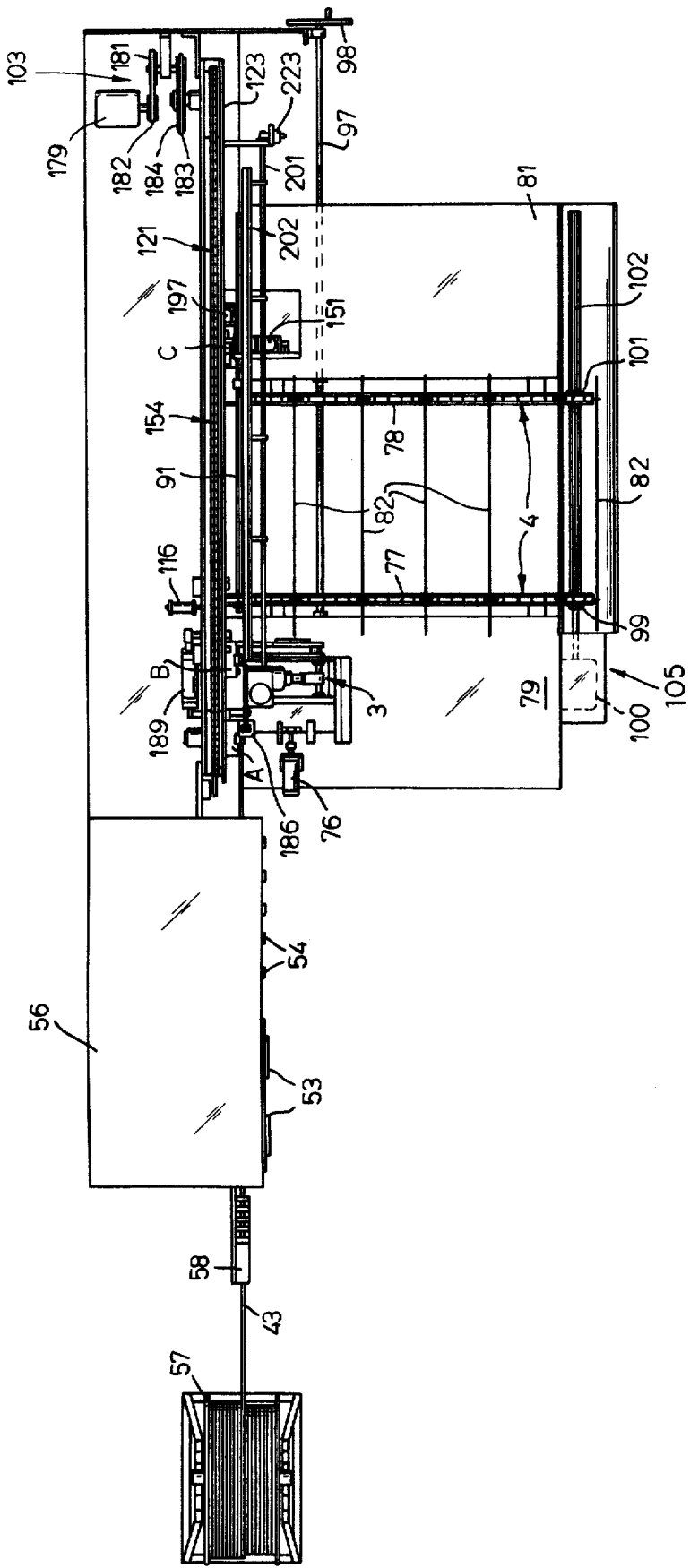
FIG. 2 is a top view of FIG. 1.

The principal operating components of the apparatus shown in FIG. 1 are: a wire feeding unit 1 and associated wire length measuring unit 2; a wire cutting mechanism 3; an endless chain type wire transport conveyor 4 (FIG. 2); and a wire transfer system 6 extending between the feeding unit 1, the cutting mechanism 3 and the wire transport conveyor 4.

THE FEEDING AND MEASURING UNITS

Figure 4:
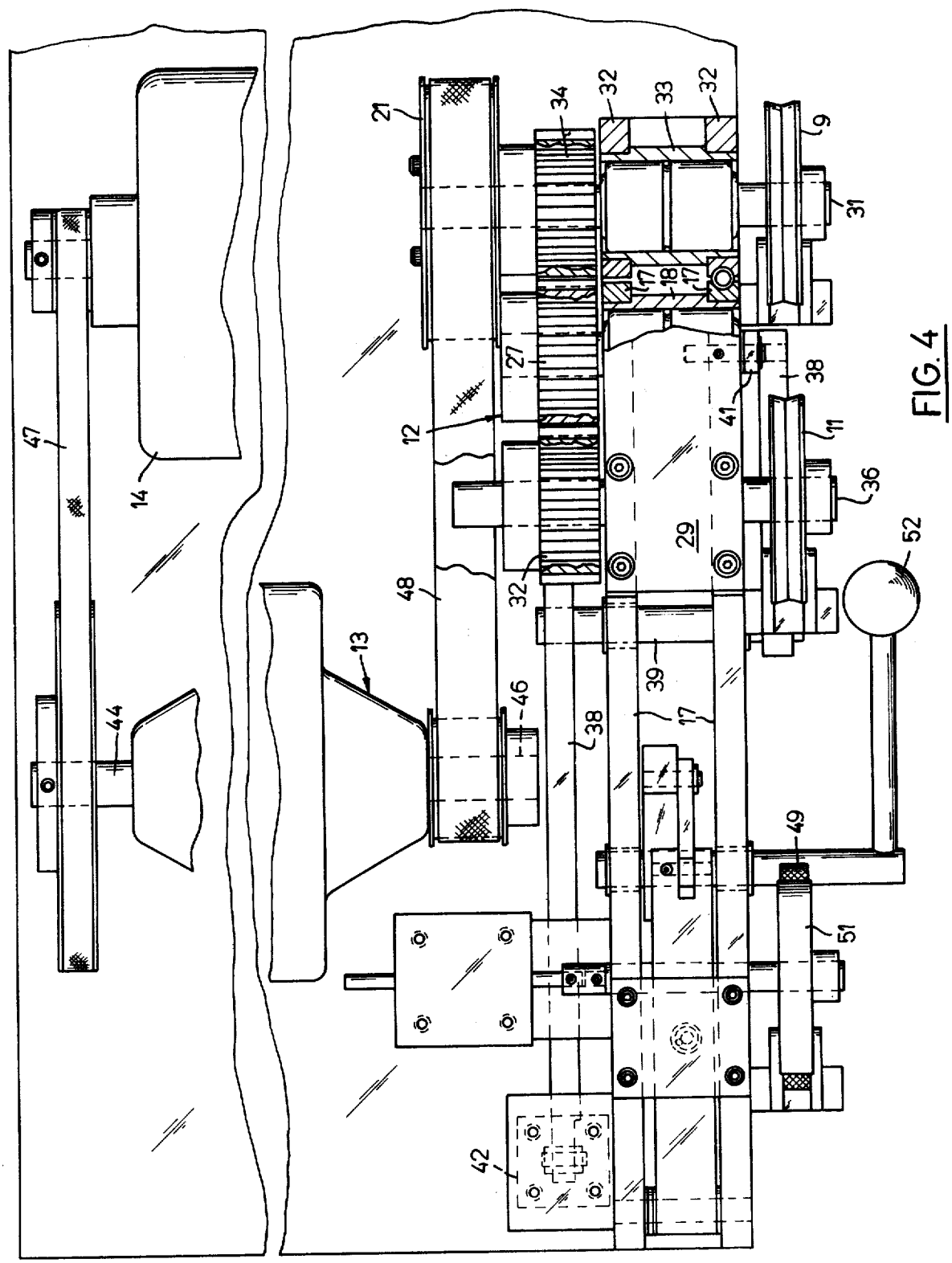
FIG. 4 is a top view of FIG. 3.

The wire feeding unit 1 comprises a pair of lower power driven wire propelling rollers 7 and 8 (FIG. 1); a pair of upper power driven wire propelling rollers 9 and 11; power transmitting gearing generally designated by the reference character 12 (FIG. 4); and a brake and clutch unit 13 connected at its power output side with the gearing 12 and at its power input side with an electric motor 14.

Figure 5:
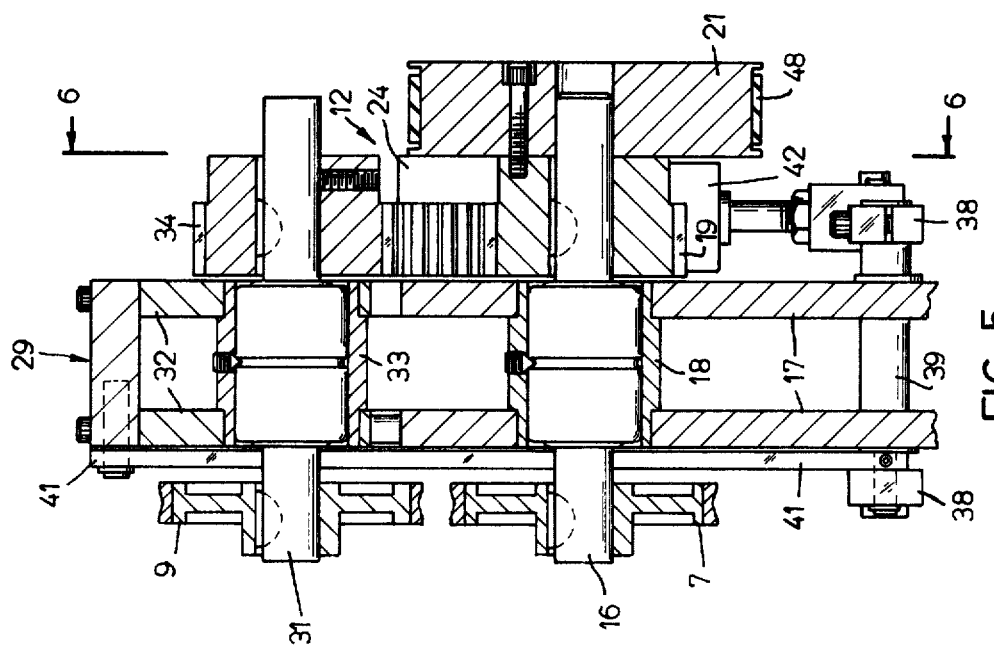
FIG. 5 is a section on line 5—5 of FIG. 3.

As shown in FIG. 5, the forward, lower wire propelling roller 7 (FIG. 1) is keyed to the outward end of a shaft 16 which is rotatably supported on an upright wall structure 17 of the apparatus frame by means of a bearing 18. At its inward end the shaft 16 has keyed to it a gear wheel 19, and bolted to the gear wheel 19 is a belt pulley 21.

Figure 6:
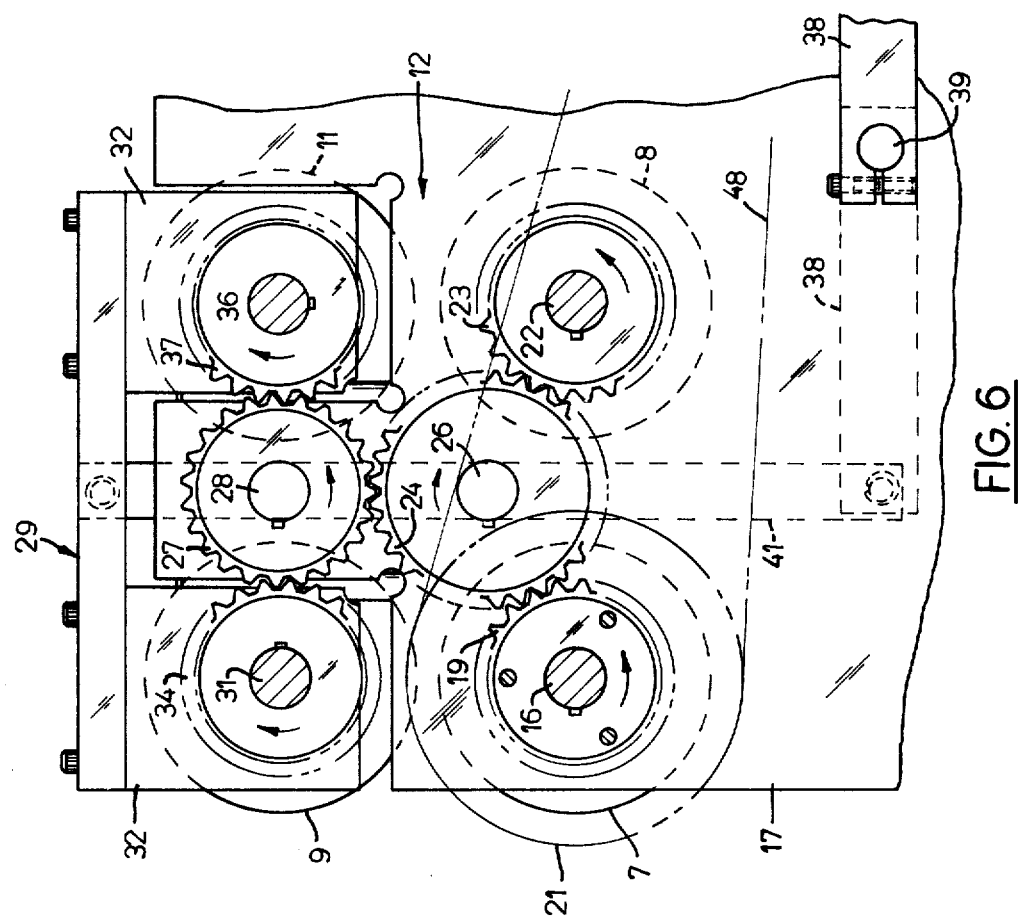
FIG. 6 is a rear view of the wire feeding mechanism taken on line 6—6 of FIG. 5.

The rearward lower wire propelling roller 8 (FIG. 1) is keyed to the outer end of a shaft 22 which, like the shaft 16, is rotatably supported in the wall structure 17, and to the inner end of which is keyed a gear wheel 23 (FIG. 6).

An idler gear 24 (FIG. 6) which is in constant mesh with the gear wheels 19 and 23 is secured to a shaft 26 which, like the shafts 16 and 22, is rotatably supported on the wall structure 17.

Another idler gear 27 (FIG. 6) which is in constant mesh with the idler gear 24 is secured to a shaft 28 which, like the shafts 16, 22 and 26, is rotatably supported on the wall structure 17.

The forward and rearward upper wire propelling rollers 9 and 11 (FIG. 1) are rotatably mounted on an up and down adjustable supporting yoke 29 which is suitably guided for vertical back and forth movement on the wall structure 17. As shown in FIG. 5, the forward upper roller 9 (FIG. 1) is keyed to the outward end of a shaft 31 which is rotatably supported on depending side plates 32 of the yoke 29 by means of a bearing 33. At its inward end the shaft 31 has keyed to it a gear wheel 34 of a suitable pitch diameter which enables the gear wheel 34 to remain in mesh with the idler gear 27 during limited up and down adjustment of the yoke 29 from the position in which it is shown in FIGS. 3 and 6.

The rearward upper roller 11 (FIG. 1) is keyed to the outer end of a shaft 36 which is rotatably supported on the yoke 29, and to the inner end of which is keyed a gear wheel 37. The pitch diameter of the gear wheel 37, like that of the gear wheel 34 is such that the gear wheel 37 may stay in mesh with the idler gear 27 during limited up and down adjustment of the yoke 29 from the position in which it is shown in FIG. 6.

Figure 3:
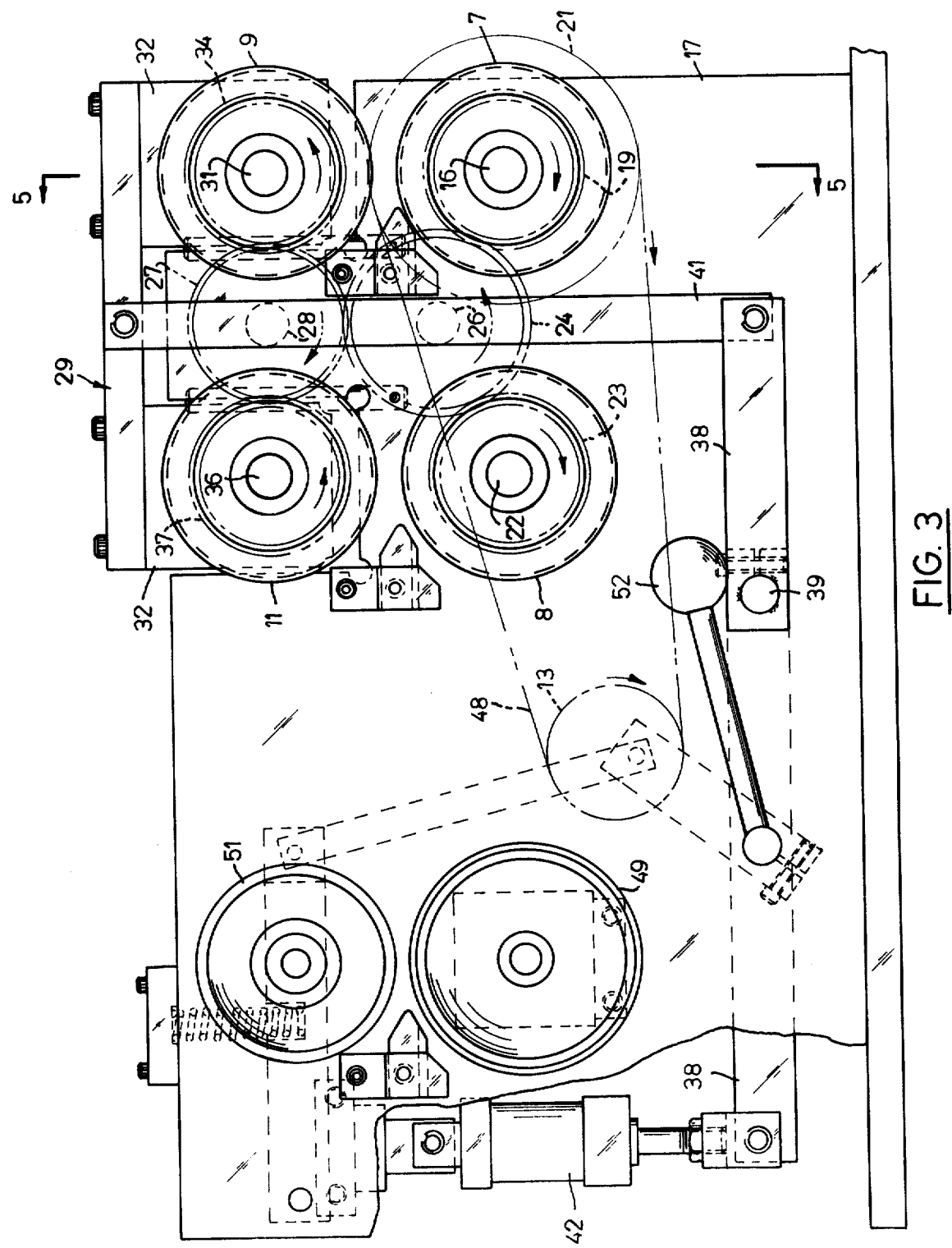
FIG. 3 is a front view of a wire feeding mechanism and associated wire lengths measuring mechanism incorporated in the apparatus shown in FIGS. 1 and 2.

Mechanism for adjusting the yoke 29 up and down is shown in FIG. 3 and comprises a walking beam assembly 38 which is pivoted on the main frame of the apparatus by means of a cross shaft 39 and which is connected at its forward end to the yoke 29 by a link 41. At its rear end, the walking beam assembly is connected to a pneumatic cylinder 42 which is expandable to raise the yoke and contractable to lower it. When a supply wire 43 (FIG. 1) is placed on the lower propelling rollers 7 and 8 and air pressure is admitted to the gland end of the cylinder 42, the upper propelling rollers 9 and 11 will bear down on the supply wire so it will be firmly gripped by all four propelling rollers.

Rotation of the wire propelling rollers 7, 8, 9 and 11 is started and stopped by operation of the clutch and brake unit 13. The clutch and brake unit 13 is a commercially available unit which incorporates an input shaft 44 and an output shaft 46. A belt 47 connects the motor 14 with the input shaft 44 of the unit 13 and a belt 48 connects the output shaft 46 of the unit 13 with the belt pulley 21 of the wire propelling roller mechanism. In operation the motor 14 will be running continuously and upon an electrical signal emitted by the wire measuring unit, the clutch of the unit 13 will be engaged while the brake of the unit is simultaneously disengaged. The supply wire 43 will then be advanced by the rotating feed rollers 7, 8, 9 and 11 (FIG. 1) toward the wire cutting mechanism 3 (FIG. 1). When the wire feeding mechanism has advanced a length of wire that has been measured by the measuring unit another impulse is emitted by the measuring unit which disconnects the clutch of the unit 13 and simultaneously engages the brake of that unit. In that condition the drive gear of the feeding mechanism will be immobilized and the supply wire which is engaged by the stopped feed rollers 7, 8, 9 and 11 will be securely retained against lengthwise back and forth shifting.

The measuring unit 2 (FIG. 1) is a computerized commercial unit which includes an encoding roller 49 which is rotatably mounted on an upright wall structure of the apparatus. A pressure roller 51 for keeping the supply wire 43 in contact with the encoding roller 49 is movable up and down, as illustrated in FIG. 3, by a suitable link mechanism including a hand lever 52. Various accessories such as counters 53 of the wire length measuring mechanism and a number of push buttons 54 for the electrical control of the apparatus are mounted on a housing 56 enclosing the wire feeding unit 1 and the wire measuring unit 2. The supply wire is stored on a reel 57 (FIG. 1) and passed through a straightening unit 58 before it enters between the rollers 49 and 51 of the wire length measuring mechanism 2.

THE WIRE CUTTING MECHANISM

Figure 13:
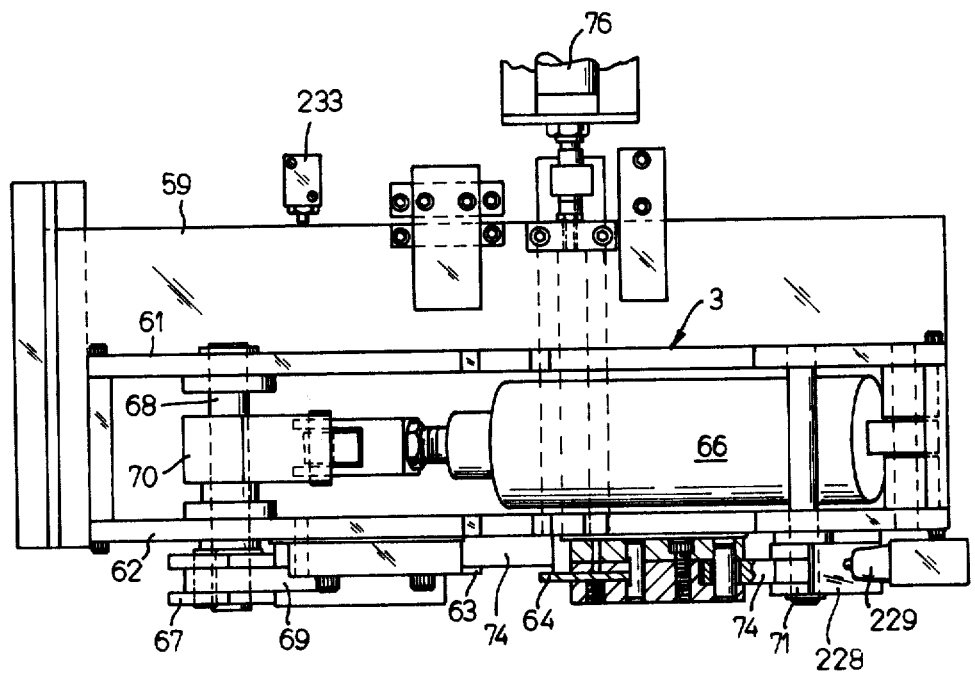
FIG. 13 is a top view of FIG. 12.
Figure 12:
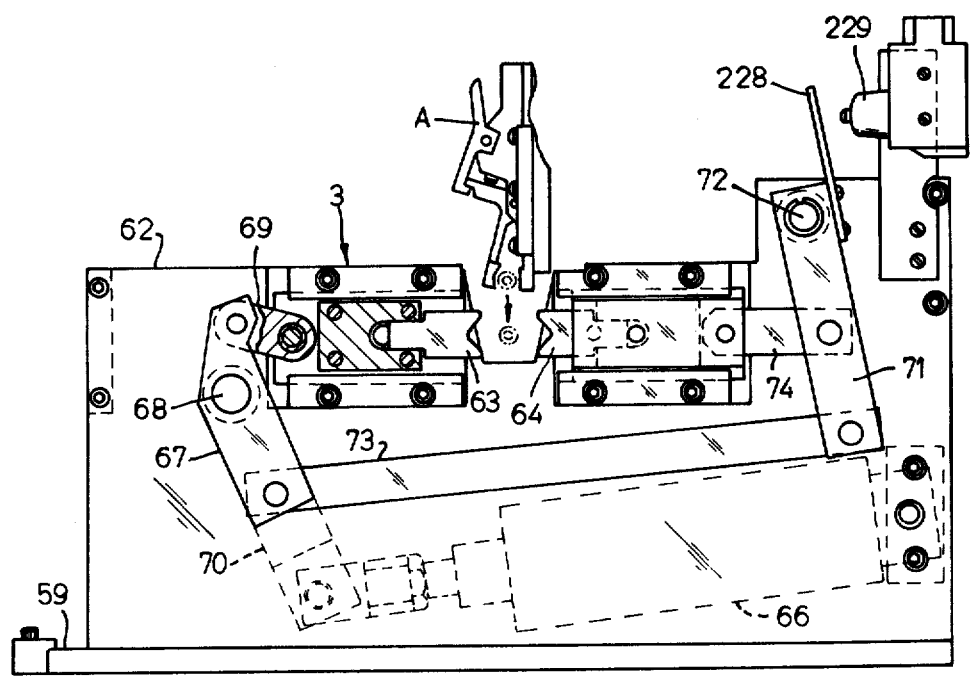
FIG. 12 is a sectional view on line 12—12 of FIG. 7.
Figure 15:
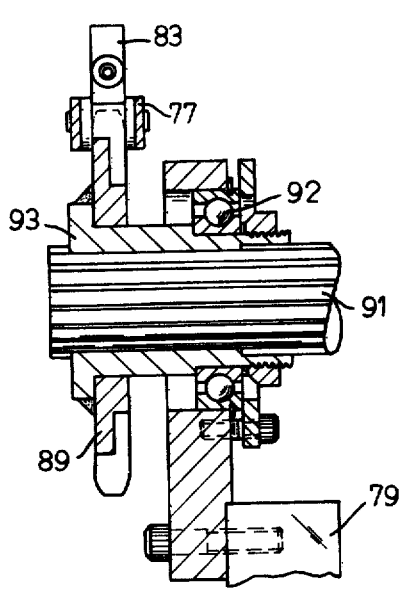
FIG. 15 is a section on line 15—15 of FIG. 14.
Figure 16:
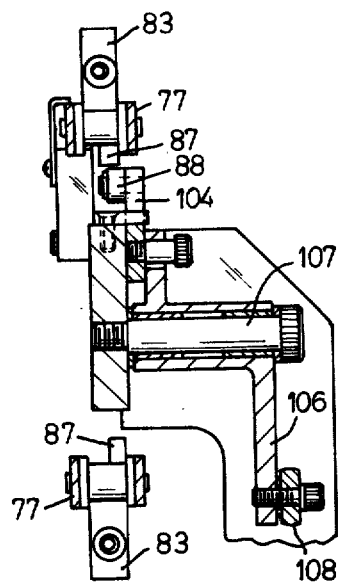
FIG. 16 is a section on line 16—16 of FIG. 14.

The wire cutting mechanism 3 (FIG. 1) is illustrated in detail by FIGS. 12 and 13. It comprises a base plate 59 and spaced apart upright side walls 61 and 62. Reciprocably mounted on the side wall 62 are complementary wire cutting blade assemblies 63 and 64, and a mechanism for moving the blade assemblies 63 and 64 in opposite directions towards and away from each other comprises a hydraulic cylinder 66 which is mounted between the side walls 61 and 62, as shown in FIG. 13. A lever 67 is pivoted at the outside of the wall 62 on a cross pin 68, and an arm 70 between the walls 61, 62 connects the cross pin 68 with the piston rod of the cylinder 66. The other end of the lever 67 is connected to the reciprocable blade assembly 63 by a link 69. Another lever 71 is pivotally mounted at the outside of wall 62 on a cross pin 72 and is connected at its free end with the lever 67 by a tie link 73. The lever 71 is connected intermediate its ends with the blade assembly 64 by a link 74. FIG. 12 shows the cutting mechanism in an open condition in which the cylinder 66 is contracted and the blade assemblies 63 and 64 are spaced apart. Expansion of the cylinder 66 will close the cutting mechanism so as to sever supply wire which may have been lowered into the space between the separated blade assemblies 63, 64 by a feeding clamp of the wire transfer system as will be described more fully hereinbelow. One of such feeding clamps is indicated in FIG. 12 above the cutting mechanism and designated by the reference character A.

The base plate 59 of the cutting mechanism is reciprocably mounted for back and forth movement towards and away from the wire conveying mechanism 4 (FIG. 1) for a purpose which will be explained more fully hereinbelow with reference to FIGS. 25 and 26. A pneumatic cylinder 76 (FIG. 1) is mounted on the main section of the apparatus frame in a fixed position and its piston rod is operatively connected with the base plate 59 so that expansion of the pneumatic cylinder 76 will shift the cutting mechanism 3 from a retracted to a projected position adjacent the conveyor assembly 4 and so that contraction of the cylinder 76 will move the cutting mechanism from its projected position to a retracted position away from the conveying mechanism 4.

THE WIRE CONVEYING MECHANISM

Figure 10:
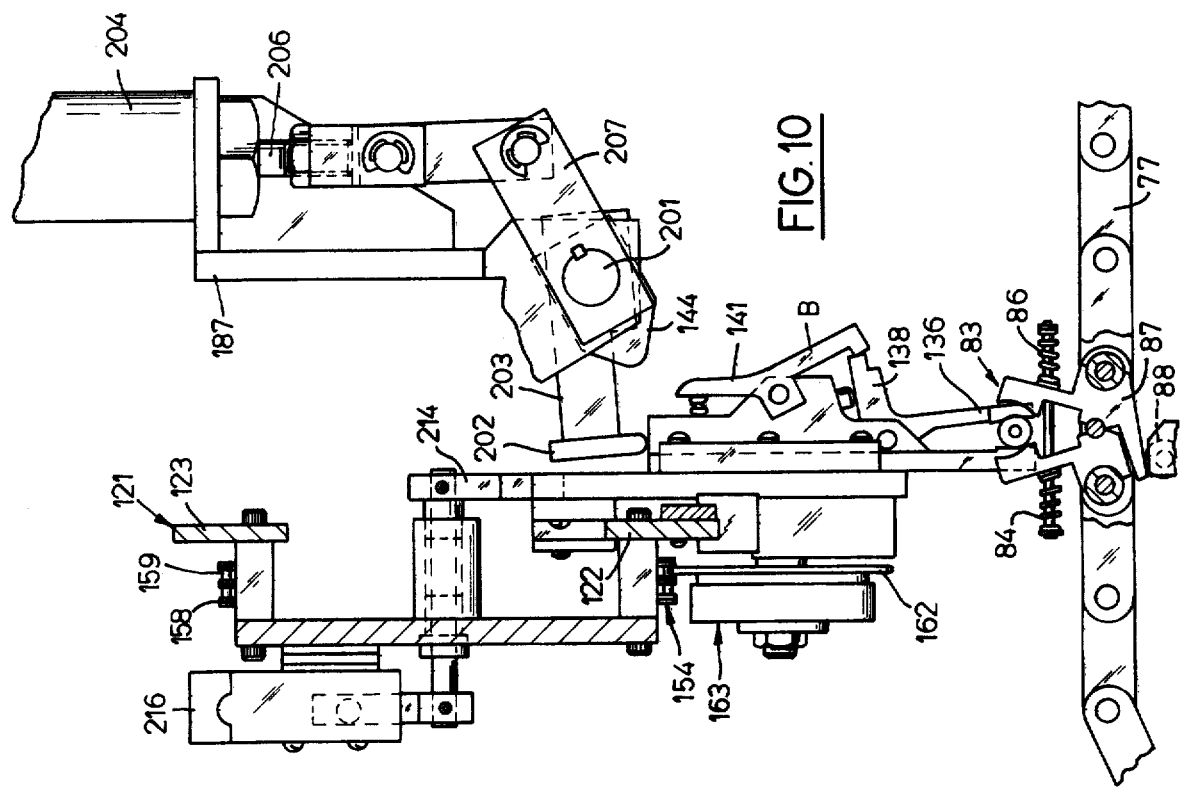
FIG. 10 is a section on line 10—10 of FIG. 7 showing a different phase of operation than FIG. 7.

The wire conveying mechanism 4 (FIG. 2) comprises a pair of endless chains 77 and 78 which are mounted respectively on a fixed side frame section 79 of the apparatus frame and on a laterally adjustable side frame section 81 of the apparatus frame. The conveyor chains 77 and 78 are similar to conveyor chains which are incorporated in the apparatus of the mentioned earlier U.S. Pat. No. 3,701,301. That is, each of the conveyor chains is provided with a series of wire gripping clamps which may be closed and opened to clamp successive lengths 82 of cut-off supply wire to the conveyor chains and release them therefrom. In FIG. 10 one of the wire gripping jaws of the conveyor chain 77 is designated by the reference character 83 and shown in an open position. As explained more fully in the mentioned U.S. Pat. No. 3,701,301, the jaws of the wire gripping clamp 83 are normally urged toward each other by coil springs 84 and 86 and an actuating finger 87 on one of the jaws is engageable by a reciprocable cam roller 88 so as to adjust the clamp 83 to a wire gripping position (FIG. 11) and to a wire releasing position (FIG. 10).

Figure 7:
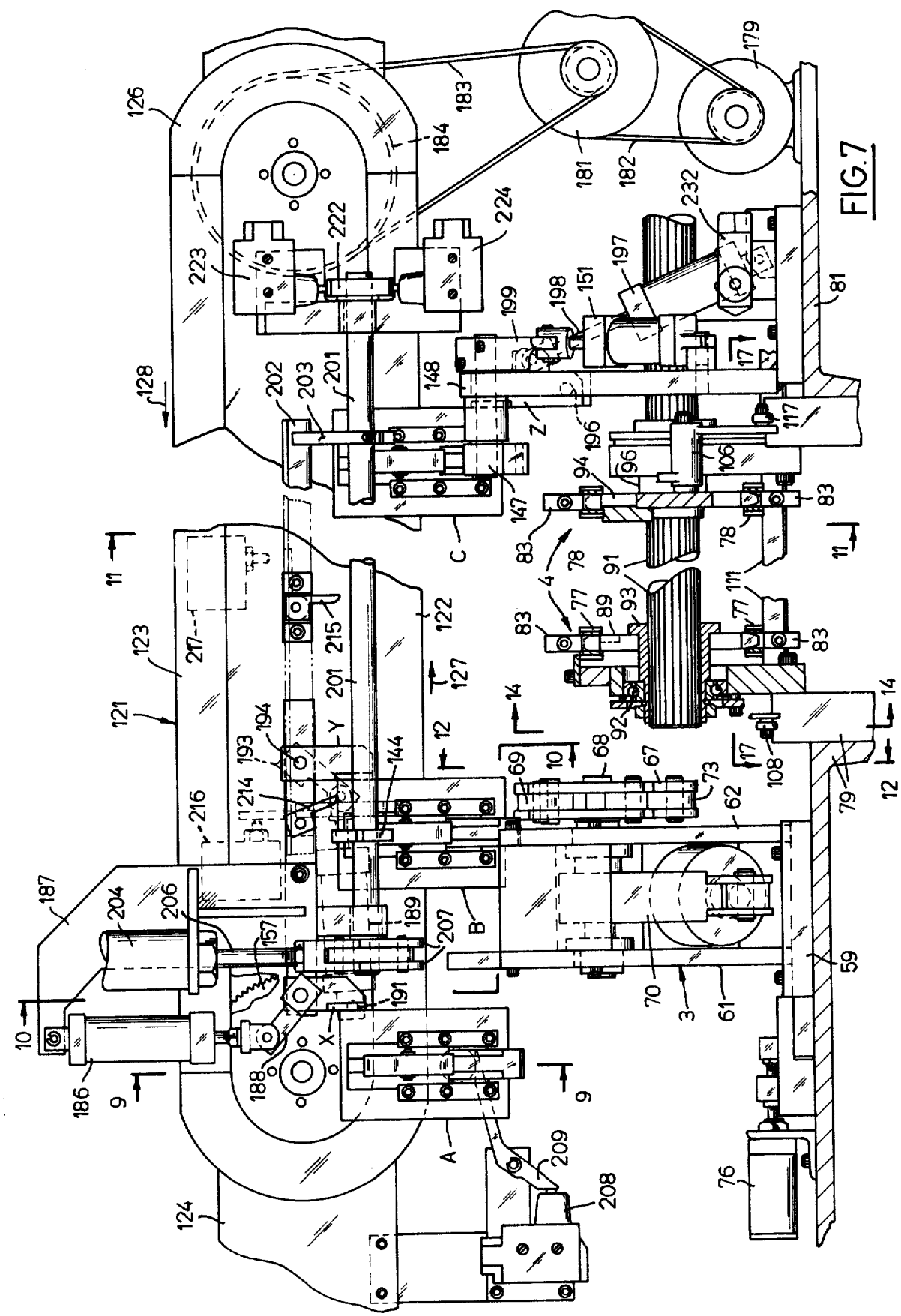
FIG. 7 is an enlarged fragmented front view of a wire transfer system incorporated in the apparatus shown in FIG. 1.

As shown in FIG. 7, a supporting sprocket 89 for the conveyor chain 77 is mounted in a bearing 92 on the fixed side frame section 79 of the apparatus, and a spline shaft 91 is engaged with internal splines of the hub sleeve 93 of the sprocket 89.

Similarly, a supporting sprocket 94 for the conveyor chain 78 is mounted in a bearing 96 on the laterally adjustable frame section 81, and internal splines of a hub sleeve of the sprocket 94 engage the external splines of the shaft 91 in axially shiftable relation thereto. Accordingly, whenever the side frame section 81 is moved closer to or further away from the side frame section 79 by means of a feed screw 97 (FIG. 1) and hand wheel 98 the sprocket wheel 94 will move with it along the spline shaft 91.

At the output end of the conveyor 4 the chain 77 is supported on a laterally fixed sprocket wheel 99, and the chain 78 is supported on a sprocket wheel 101 which is shiftable along with the side frame section 81 axially of spline shaft 102. One end of the spline shaft 102 is connected to a drive mechanism 105 (FIG. 2) which is mounted on the fixed side frame section 79. The drive mechanism 105 includes an electric motor 100 (FIG. 2) and an electrically controlled indexing mechanism (not shown) whose construction and operation are well known in the art. Briefly, the indexing mechanism functions to successively present registering pairs of open wire gripping clamps of the conveyor chains 77, 78 to the wire transfer system, and when a measured cut-off length of supply wire has been placed into and gripped by the registering pair of conveyor clamps, to advance the conveyor chains one step to present a new pair of open registering conveyor clamps to the wire transfer system.

Figure 14:
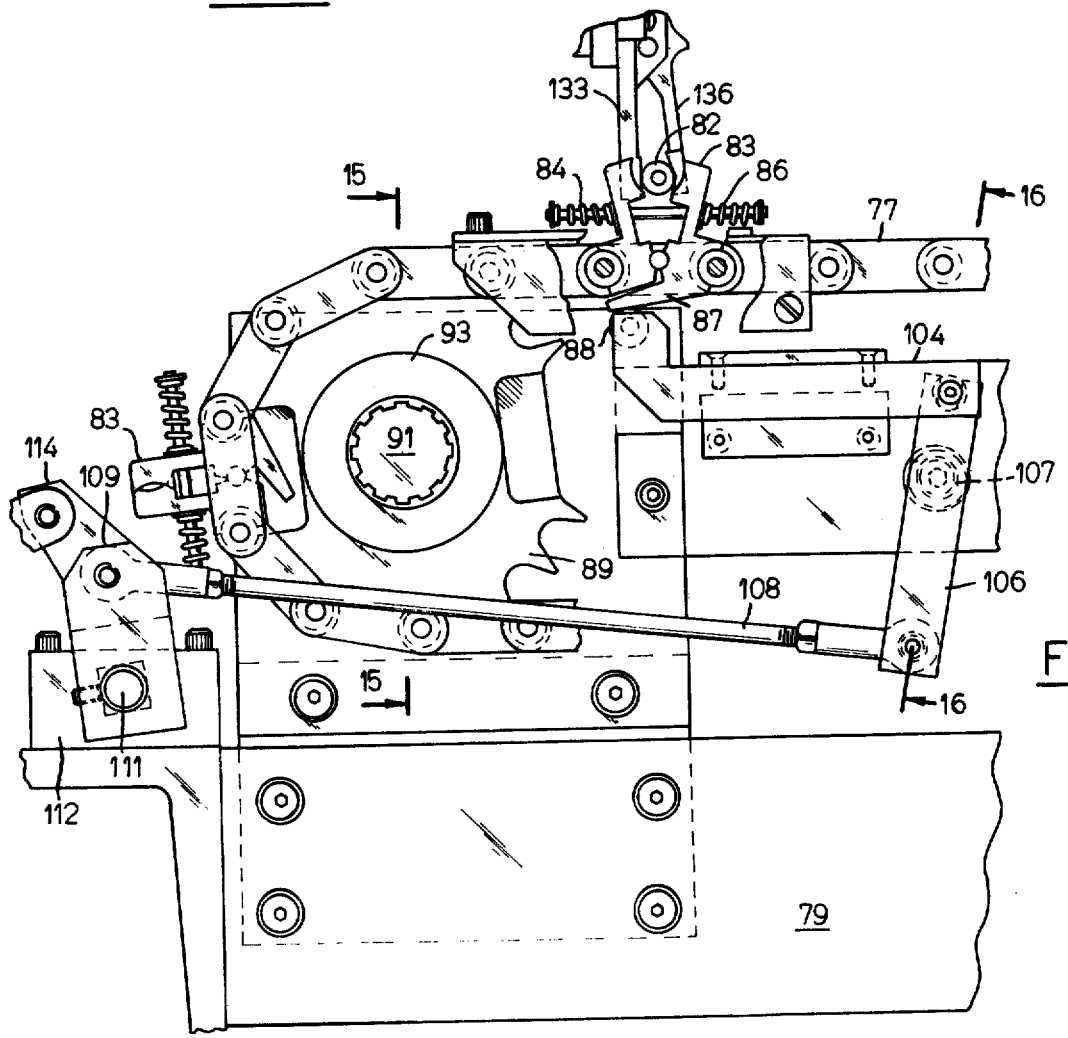
FIG. 14 is a section on line 14—14 of FIG. 7.
Figure 17:
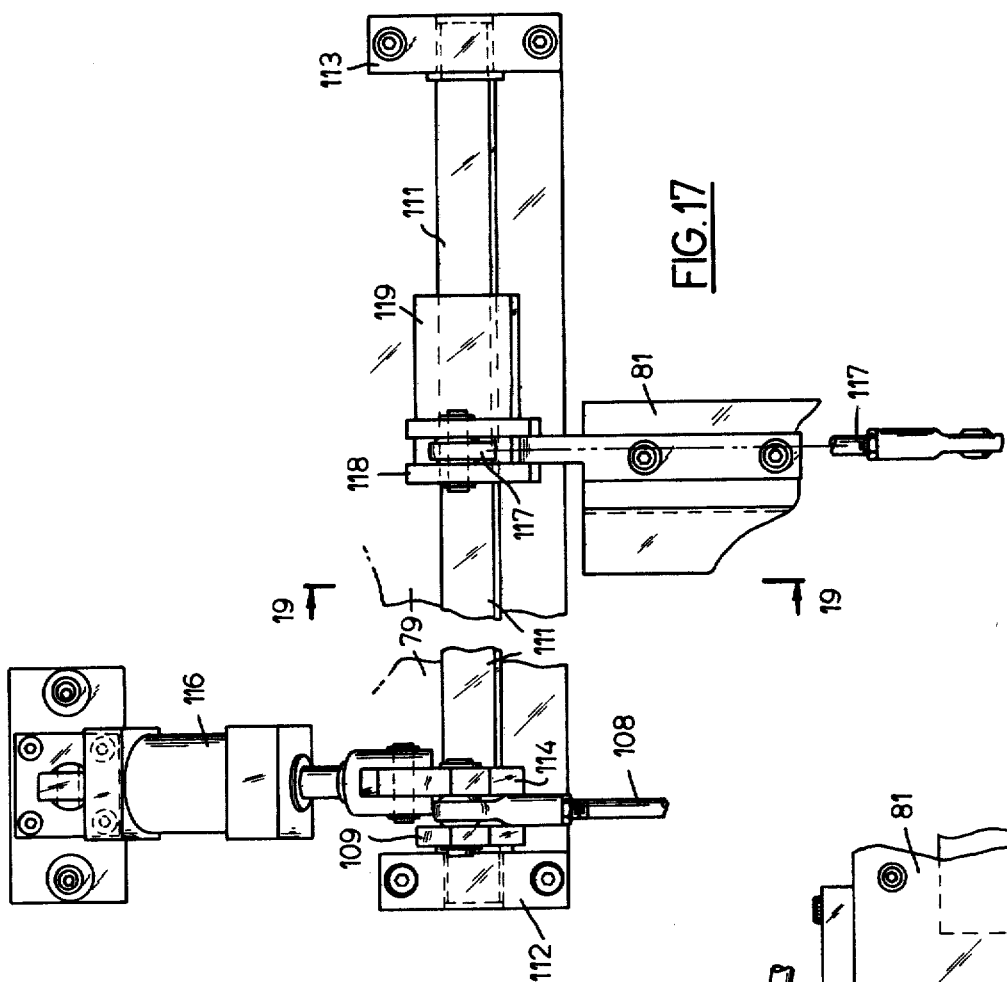
FIG. 17 is a top view generally along line 17—17 in FIG. 7.
Figure 18:
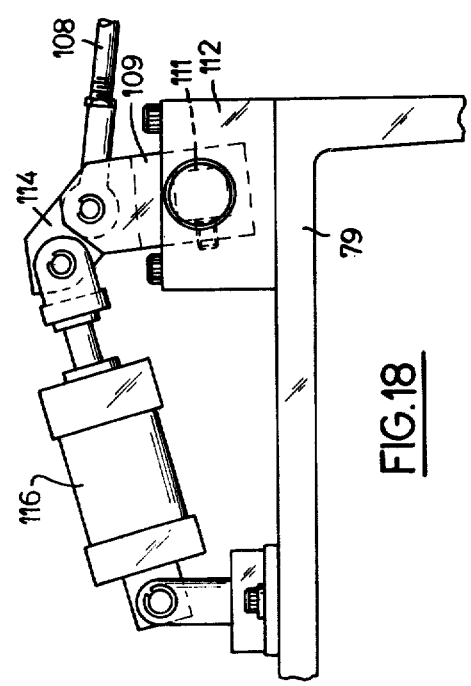
FIG. 18 is an end view of FIG. 17.
Figure 19:
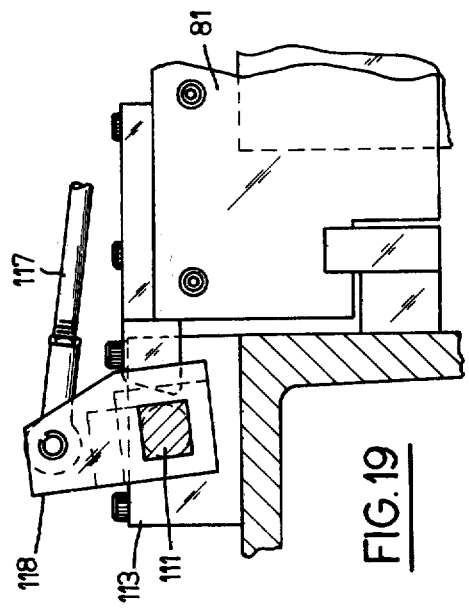
FIG. 19 is a section on line 19—19 of FIG. 17.

As shown in FIG. 14, the cam roller 88 (FIG. 14) for opening and closing the jaws of the wire gripping clamps 83 on the conveyor chain 77 is rotatably mounted on a back and forth reciprocable slide 104 which, upon movement in one direction, will open the gripping jaws of the indexed conveyor clamp, as shown in FIG. 14, and which, upon movement in the other direction, will close the indexed conveyor clamp in accordance with well established principles. The slide 104 in FIG. 14 is reciprocable back and forth by a double-armed lever 106 which is pivotally intermediate its ends on the apparatus frame by a pin 107. Rocking movement is transmitted to the lever 106 by a link 108 which is connected to an arm 109 on a rock shaft 111. As shown in FIG. 17, the rock shaft 111 is journalled at its opposite ends in bearings 112 and 113 on the main frame of the apparatus. Also secured to the rock shaft 111, as shown in FIGS. 17 and 18, is an arm 114; and a pneumatic cylinder 116 is operatively interposed between the arm 114 of the rock shaft 111 and the main frame of the apparatus.

Figure 11:
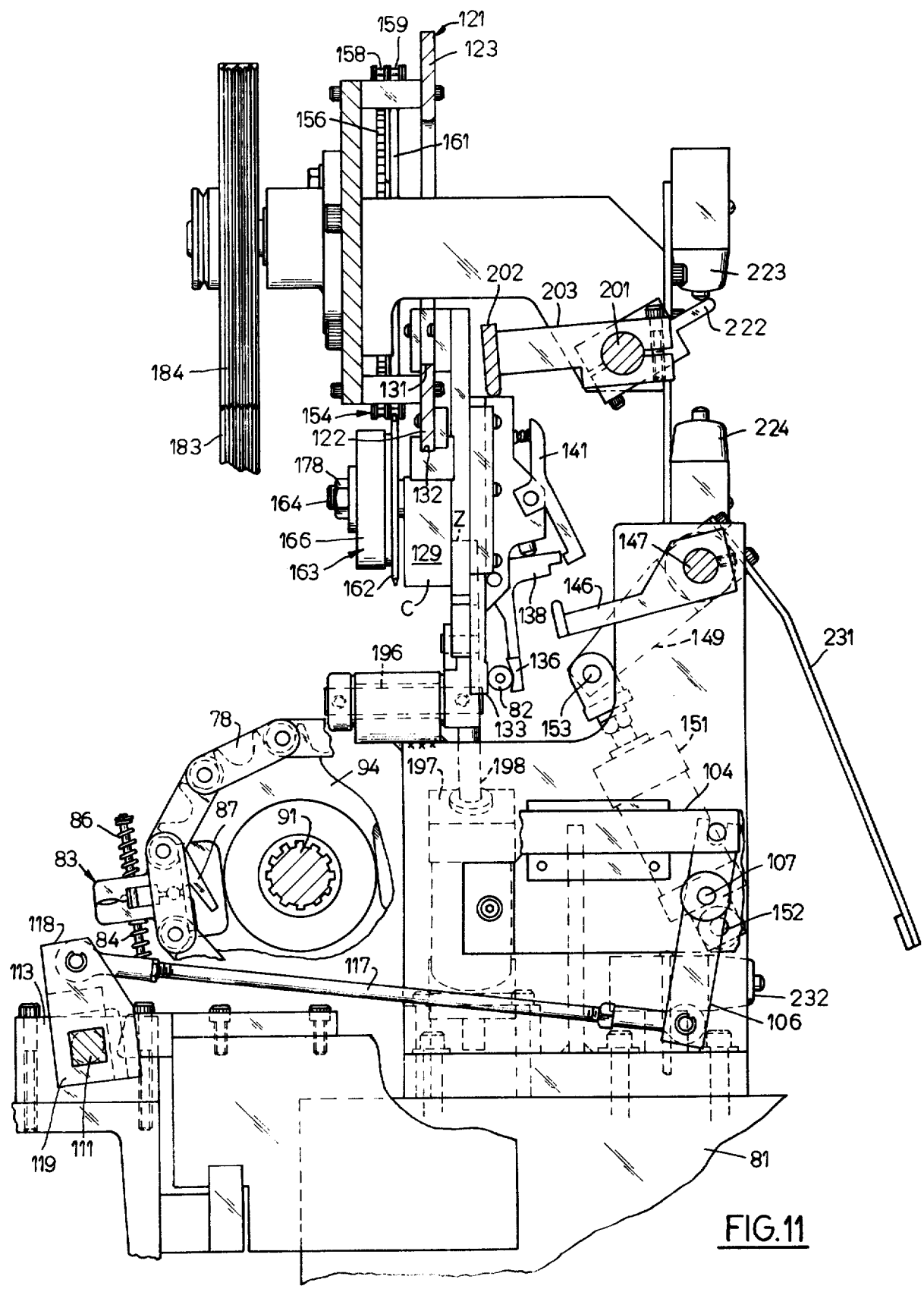
FIG. 11 is a section on line 11—11 of FIG. 7 showing the same phase of operation as FIG. 10.

Expansion of the cylinder 116 will be transmitted through the link 108 and lever 106 to the slide 104 so as to withdraw the cam roller 88 from the actuating finger 87 of the indexed conveyor clamp 83 and thereby cause that clamp to close under the action of the coil springs 84 and 86. Contraction of the cylinder 116, on the other hand, is transmitted through the link 108, lever 106 and slide 104 to the roller 88 so as to adjust the indexed conveyor clamp 83 to the open position in which it is shown in FIG. 14. The wire gripping clamps of the conveyor chain 78 on the laterally adjustable side frame section 81 are constructed and actuated in the same manner as the wire gripping clamps of the conveyor chain 77 as shown in FIG. 14. As shown in FIG. 11, a link 117 corresponding to the link 108 in FIG. 14 is connected to a rock arm 118 on a bushing 119 (FIG. 17) which is slideable along the rock shaft 111 and swingable back and forth in unison therewith. Whenever the cylinder 116 contracts it causes not only opening of an indexed wire gripping clamp on the conveyor chain 77, but also opening of an opposite indexed wire gripping clamp on the conveyor chain 78. Conversely, when the cylinder 116 expands it not only causes closing of an indexed wire gripping clamp on the conveyor chain 77 but also closing of an opposite, indexed wire gripping jaw on the chain 78, irrespective of the lateral spacing between the fixed side frame 79 and the adjustable side frame 81, and the corresponding lateral spacing of the conveyor chain 78 from the conveyor chain 77.

THE WIRE TRANSFER SYSTEM

An endless oblong track 121 is mounted in a fixed position on the main section of the apparatus frame so as to extend across and above the wire conveying mechanism 4. As shown in FIG. 1, the track 121 comprises parallel, vertically spaced straight stretches 122 and 123 between a semi-circular rear end 124 and a semi-circular front end 126 of the track. Slideably connected with the track are three wire transfer clamps A, B and C which are movable in series around the track, the direction of travel of the clamps on the lower stretch being indicated by the arrow 127 in FIG. 1 and the direction of travel of the clamps on the upper stretch 123 of the track being indicated by the arrow 128 in FIG. 1.

Figure 9:
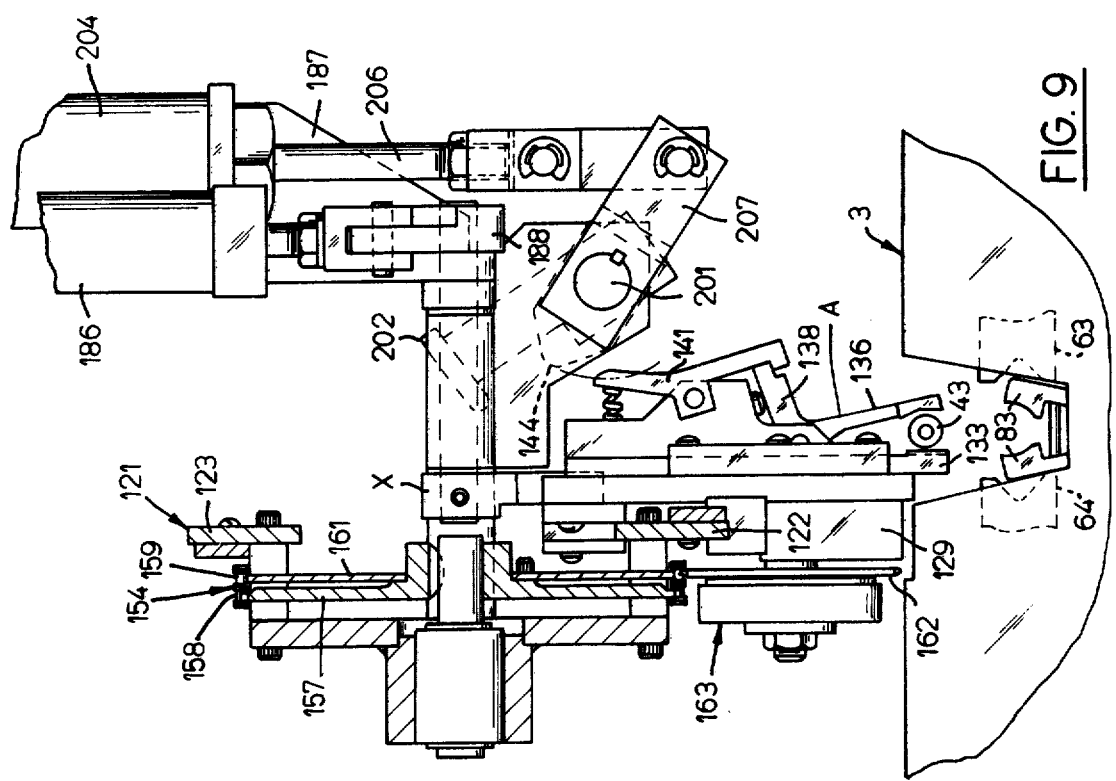
FIG. 9 is a section on line 9—9 of FIG. 7.
Figure 20:
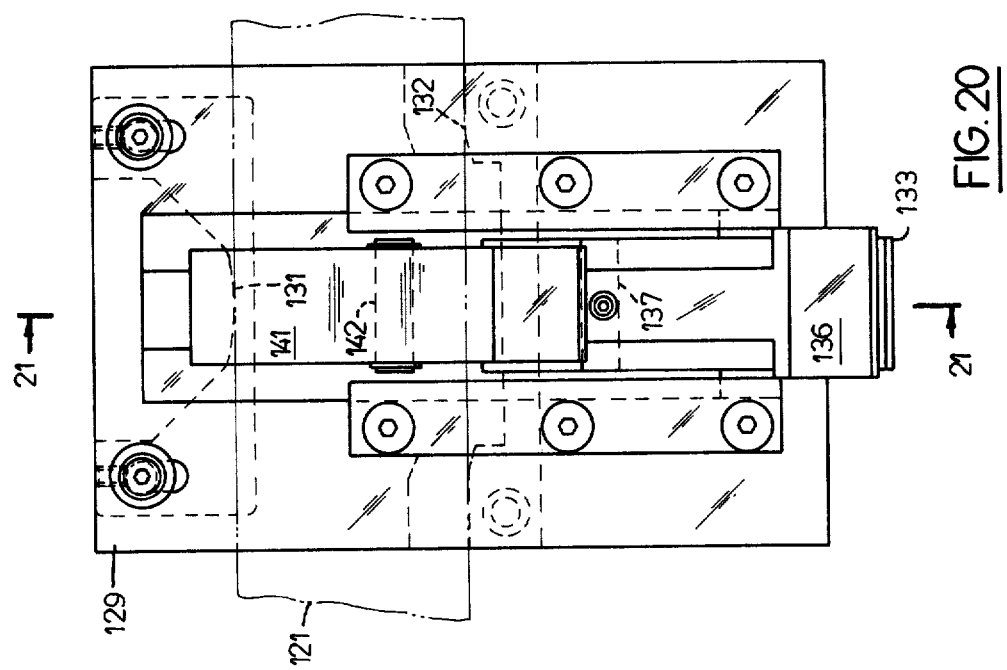
FIG. 20 is an elevational view of a wire transfer clamp.
Figure 21:
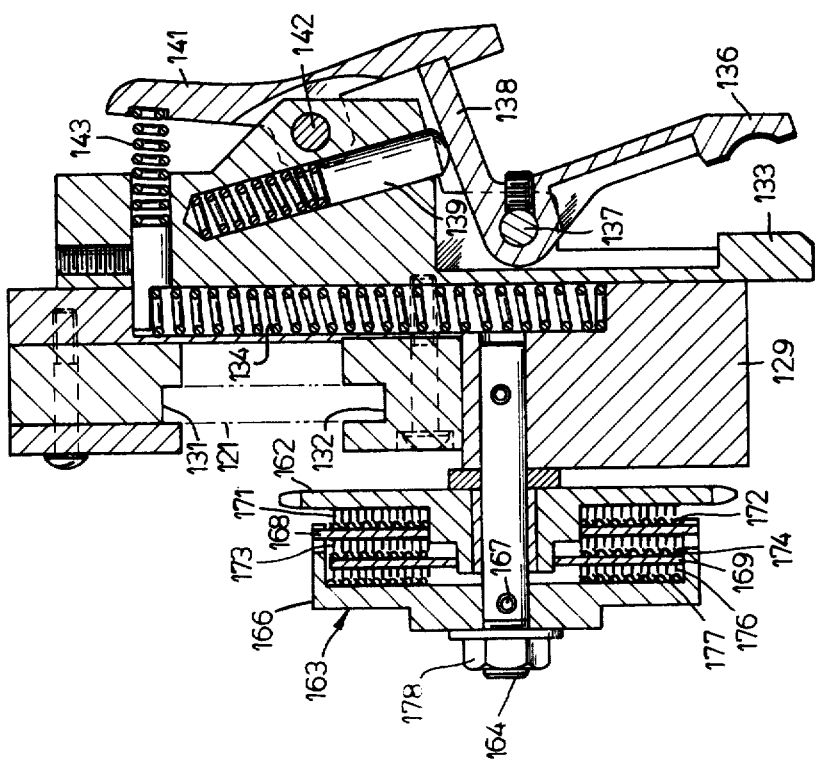
FIG. 21 is a section on line 21—21 of FIG. 20.

The clamps A, B and C are all alike and constructed as shown in FIGS. 20 and 21. A base section 129 of the clamp is fitted upon the track 121 by a groove 131 in the upper part of the base section 129 and by a groove 132 in an intermediate portion of the base section 129. A reciprocable wire gripping jaw 133 is slideably mounted on the base section 129 at the forward side of the track 121, for bodily movement transversely of the track to an inwardly retracted and outwardly projected position. The jaw 133 is yieldingly urged into its inwardly retracted limit position by a coil spring 134 as shown in FIG. 21. A complementary wire gripping jaw 136 is pivotally mounted on the reciprocable jaw 133 by means of a pivot pin 137. The pivoted jaw 136 is provided with a radial arm 138, and a spring loaded plunger 139 on the reciprocable jaw 133 bears upon the arm 138 of the jaw 136 in a clamp closing direction. A trigger 141 is pivoted on the reciprocable jaw 133 by means of a pivot pin 142 and a coil spring 143 on the reciprocable jaw 133 urges the trigger 141 into latching engagement with the arm 138 of the pivoted jaw 136. FIG. 21 shows the pivoted jaw 136 in a cocked position, and control mechanism which is shown in FIGS. 9 and 10 and which will be discussed later includes a cam lug 144 which is engageable with the trigger 141 in order to release it from the arm 138 of the jaw 136 so that the jaw 136 will swing under the pressure of the spring loaded plunger 139 into the wire gripping position in which it is shown in FIG. 10. Mechanism for recocking the jaw 136 from its clamp closing FIG. 10 position to its clamp opening FIG. 9 position is mounted on the movable side frame section 81, as shown in FIG. 11, and includes a rocker arm 146 on a shaft 147 which, as shown in FIG. 7, is pivotally supported on a bracket 148 mounted on the side frame 81. An actuating arm 149 (FIG. 11) on the shaft 147 is connected to a pneumatic cylinder 151 which is pivotally mounted on the side frame section 81 by means of a pivot pin 152, and the piston rod of the cylinder 151 is pivotally connected to the actuating arm 149 by a connecting pin 153. Expansion of the pneumatic cylinder 151 causes the actuating arm 146 to engage the arm 138 of the pivoted jaw 136 and swing it into the jaw opening position in which it is shown in FIG. 21 and in which it is cocked by the trigger 141. Subsequent contraction of this pneumatic cylinder 151 will leave the pivoted gripping jaw 136 in its cocked clamp opening position until the trigger is again engaged by the cam lug 144 (FIG. 9) as will be discussed more fully hereinbelow.

Figure 8:
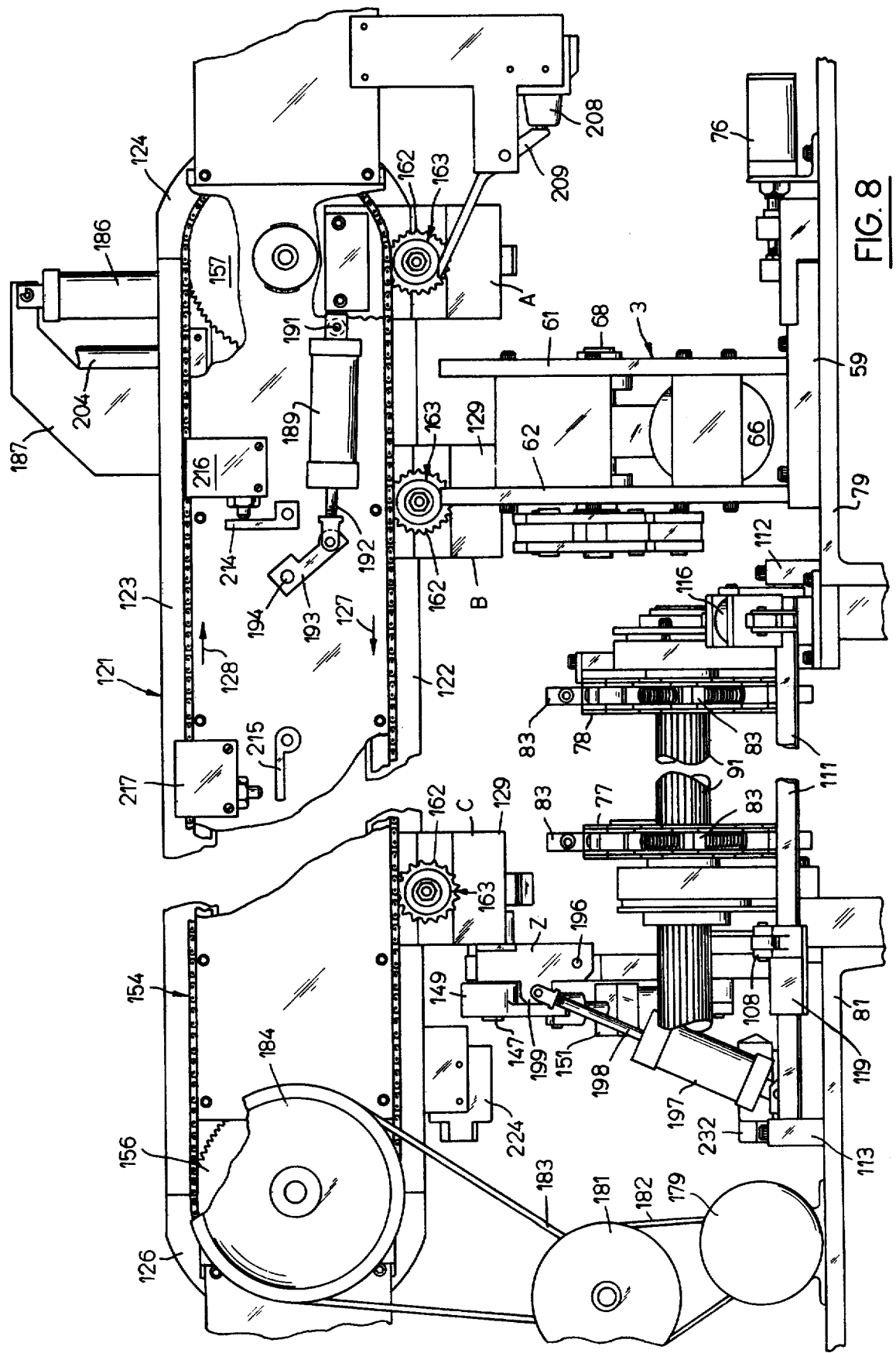
FIG. 8 is a rear view of FIG. 7.

The mechanism for circulating the wire transfer clamps A, B and C along the endless track 121 is shown in FIG. 8 and comprises a dual link chain 154 which is trained about a driving sprocket 156 at the forward end of the track 121 and about an idler sprocket 157 at the rear end of the track 121. As shown in FIG. 9, the idler sprocket 157 engages one section 158 of the dual link chain 154, and the driving sprocket 156 (FIG. 8) similarly engages said one section 158 of the dual link chain. The other section 159 (FIG. 9) of the dual link chain 154 is supported at the rear end of the track by a blind disc 161 and at the forward end of the track 121 the section 159 of the dual link chain is similarly supported on a blind disc coaxial with the idler sprocket 156.

Figure 22:
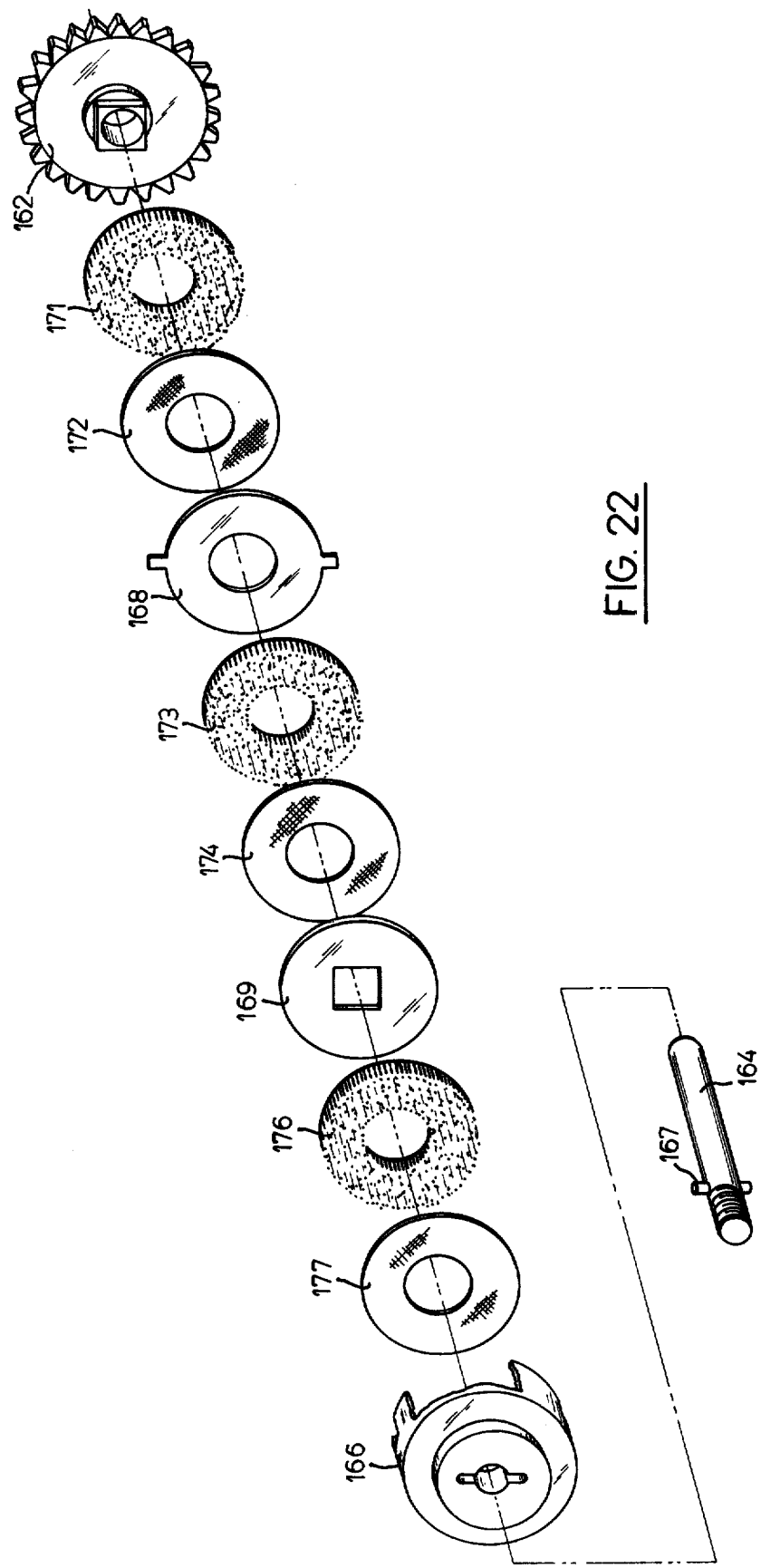
FIG. 22 is an exploded view of a friction clutch incorporated in the wire transfer clamp shown in FIG. 21.

Operatively interposed between the section 159 of the link chain 154 and each of the wire transfer clamps A, B and C is a yieldable draft transmitting connection. As shown in FIGS. 8, 9, 10 and 21, such draft transmitting connection comprises a sprocket wheel 162 on each of the transfer clamps in engagement with the section 159 of the dual link chain 154, and a disc clutch 163 between the sprocket wheel 162 and the base section 129 of each clamp. As shown in FIG. 21, a fixed stud 164 on the base section 129 of the clamp rotatably supports the sprocket wheel 162 and an axially back and forth shiftable torque transmitting housing cup 166 is nonrotatably connected to the stud 164 by means of a cross pin 167 (FIG. 22). Intermediate the sprocket wheel 162 (FIG. 21) and the housing cup 166 a washer 168 is splined to the housing cup 166 and rotatably supported on the hub of the sprocket wheel 162. Another axially shiftable washer 169 is non-rotatably connected to the hub of the sprocket wheel 162 between the washer 168 and the housing cup 166. A friction disc 171 (FIG. 22) and a wire screen disc 172 are rotatably supported in axial contact with each other on the hub of the sprocket wheel 162 in frictional engagement with the latter and with the disc 168; another friction disc 173 and wire screen disc 174 in axial contact with each other are interposed between the disc 168 and the disc 169 in frictional engagement therewith; and another friction disc 176 and wire screen 177 in axial contact with each other are interposed between the disc 169 and the housing cup 166 in frictional engagement therewith. A nut 178 (FIG. 21) on the outer end of the stud 164 is drawn up against the housing cup 166 so as to develop a relatively strong resistance to turning of the sprocket wheel 162 relative to the clamp base section 129. Frictional torque transmitted by any sprocket wheel 162 to the base section of the associated clamp will yieldably couple the clamp to the chain 154, but when any one of the clamps is prevented from movement along the track, as will be explained later, slip between the sprocket wheel 162 and the housing cup 166 will permit the clamp to remain stationary while the chain 154 continues to move around the driving and driven sprocket wheels 156 and 157 and exerts a strong propelling pull upon the stationary clamp. Driving torque is transmitted to the sprocket wheel 156 from an electric motor 179 (FIG. 7) by a speed reducing belt drive comprising an idler wheel 181 on the apparatus frame, a drive belt 182 between the motor 179 and the idler wheel 181 and another belt 183 between the idler wheel 181 and a belt pulley 184 connected to the sprocket wheel 156.

In operation, the chain 154 is continuously driven around the front and rear sprocket wheels 156 and 157, and movement of the clamps A, B and C along the lower track stretch 122 is controlled by three gates X, Y and Z which are mounted along the lower track stretch 122, the gates X and Y being mounted on the main section of the frame and the gate Z being mounted on the laterally adjustable side section 81 of the frame. The gate X at the rear end of the endless oblong track 121 will be designated as a clamp holding gate, the gate Y will be designated as a clamp starting gate, and the gate Z will be designated as a clamp intercepting gate.

The clamp holding gate X, as shown in FIG. 7, is pivotally mounted on the main frame for swinging movement from a clamp holding position in which it is shown in FIG. 7 to a clamp releasing position in which it is shown in FIG. 24. An actuating mechanism for the holding gate X comprises a pneumatic cylinder 186 which is suspended from a mounting bracket 187 on the apparatus frame and whose piston rod is connected with an actuating arm 188 of the gate X. Contraction of the cylinder 186 adjusts the holding gate X to its clamp stopping position (FIG. 7) and expansion of the cylinder 186 adjusts the holding gate X to its clamp clearing position (FIG. 24).

The starting gate Y is pivotally mounted on the apparatus frame for back and forth swinging movement on a transverse axis between the clamp stopping position in which it is shown in FIG. 7 and a clamp clearing position in which it is shown in FIG. 23. An actuating mechanism for the starting gate Y comprises a pneumatic cylinder 189 (FIG. 8) which is mounted at its barrel end on the apparatus frame by means of a pivot pin 191 and whose piston rod 192 is connected to a rocker arm 193 on a cross shaft 194 which also carries the gate Y.

The clamp intercepting gate Z, which is mounted on the laterally adjustable side frame 81 of the apparatus, is pivotally supported on a cross pin 196 (FIG. 7) for swinging movement from a gate stopping position in which it is shown in FIG. 7 to a gate clearing position in which it is shown in FIG. 23. An actuating mechanism for the gate Z comprises a pneumatic cylinder 197 (FIG. 8) which, as shown, is pivotally connected at its barrel end to the adjustable side frame 81 and whose piston rod 198 is pivotally connected to a lug 199 of the gate Z. Expansion of the cylinder 197 adjusts the gate Z to a clamp intercepting position in which it is shown in FIG. 8, and contraction of the cylinder 197 swings the gate Z from its clamp intercepting to its clamp clearing position as shown in FIG. 23.

A mechanism for opening and closing the wire gripping jaws of the clamps A, B and C comprises a rock shaft 201 (FIG. 1) which is rotatably mounted at its opposite ends in bearings on the main section of the apparatus frame and which extends almost the entire length of the track 121 between its semi-circular front and rear ends (FIG. 1). A clamp control bar 202 (FIG. 1) is mounted on radial arms 203 which are secured to the rock shaft 201 at fixed axial spacings from each other, the rear end of the clamp control bar 202 being located near the rear end of the shaft 201, and the front end of the bar 202 being spaced rearwardly from the front end of the shaft 201. At its rear end the rock shaft 201 mounts the hereinbefore mentioned cam lug 144 which is operable to trip the trigger 141 of any transfer clamp which has been moved against the closed starting gate Y. An actuating mechanism for the rock shaft 201 comprises a pneumatic cylinder 204 which is mounted in an upright position on the bracket 187 and whose piston rod 206 (FIG. 9) is connected to the free end of a radial arm 207 of the rock shaft 201. Expansion of the cylinder 204 adjusts the clamp control bar 202 to a raised position out of engagement with the reciprocable jaw 133 of any wire transfer clamp which is stopped by the starting gate Y or by the intercepting gate Z. Contraction of the cylinder 204 (FIG. 10) first brings the cam lug 144 into engagement with the trigger 141 of any clamp stopped by the starting gate Y and then brings the clamp control bar 202 into engagement with the reciprocable jaw 133 of any transfer clamp stopped by the starting gate Y. Lowering of the clamp control bar 202 into the FIG. 10 position also brings it into engagement with the reciprocable jaw 133 of any transfer clamp that may be positioned in proximity to the intercepting gate Z. Accordingly, the reciprocable gripping jaw 133 of any clamp stopped by the closed gate Y and the reciprocable gripping jaw 133 of any clamp positioned at the gate Z will be lowered from the raised position shown in FIG. 9 to the lowered position shown in FIG. 10 against the bias of the coil spring 134 (FIG. 21).

A monitor switch 208 (FIG. 7) is mounted on the apparatus frame in proximity to the rear end of the track 121, and an actuating lever 209 for the switch 208 is engageable by the housing cup 166 of any of the clamps A, B and C which have moved into engagement with the closed holding gate X. Rocking of the lever 209 upon engagement with the housing cup 166 of any of the clamps A, B and C closes the switch 208, and when the holding gate X is swung into its clamp clearing position (FIG. 24) the switch 208 is opened by subsequent movement of any clamp past the open holding gate.

OPERATION

Manual push on one of the electrical control buttons 54 (FIG. 1) starts rotation of the wire stock propelling rollers 7, 8, 9 and 11 while the wire transfer system is in its starting condition as illustrated by FIG. 23. In that condition the endless clamp propelling chain 154 (FIG. 8) is running continuously in the direction of arrow 127 (FIG. 1) along the lower track stretch 122; the raised and open jaws 133, 136 (FIG. 21) of the clamp A straddle the wire stock 43 at a rearward spacing from the clamp B; the path of travel of clamp A along the track stretch 122 is blocked by the closed gate X; the closed and raised jaws 132, 136 of the clamp B have gripped the free end of the wire stock 43; the path of travel of clamp B along the track stretch 122 is cleared by the open gate Y; the clamp C with its jaws 133, 136 (FIG. 21) raised and open is positioned at a forward spacing from the clamp B; the path of travel of clamp C along the track stretch 122 is cleared by the open gate Z; and the monitor switch 208 whose function will be explained later is kept closed by the cup housing 166 of the blocked clamp A.

The pull of the continuously running clamp propelling chain 154 which is transmitted to the clamp B through its associated slip clutch 163 tends to advance the clamp B from its FIG. 23 position along the track stretch 122. Such advance movement of the clamp B, however, cannot start until the propelling rollers 7–11 of the feeding unit 1 have been started to rotate, these rollers while at standstill retaining the wire stock against lengthwise displacement. Rotation of the sprocket wheel 162 of clamp B and its associated washer 169 relative to the cup housing 166 and its associated washer 168, while restrained by the axially compressed friction disks 171, 173, 176 and screen disks 172, 174, 177, enables the clamp B to remain at standstill in its FIG. 23 position before the wire propelling rollers 7–11 of the feeding unit are started to rotate.

As soon as the propelling rollers of the feeding unit start rotating, the clamp B starts to travel forward in the direction of arrow 127 along the track stretch 122 under the pull of the clamp propelling chain which is transmitted to it by the torque of its associated slip clutch 163. The linear speed of the clamp propelling chain along the track stretch 122 is substantially the same as the linear speed at which the wire stock is advanced by the propelling rollers of the feeding unit. Accordingly, the pull of the clamp propelling chain which is transmitted to clamp B through its associated slip clutch will guide the wire stock 43 forward along the track stretch 122 as it is advanced by the rotating propelling rollers 7–11 of the feeding unit.

While the clamp B initially advances from its FIG. 23 position, the pull of the clamp propelling chain is transmitted to the blocked clamp A through its associated slip clutch 163. Rotation of the sprocket wheel 162 of clamp A relative to the cup housing 166 of the slip clutch of clamp B enables the clamp B to remain at standstill while its path of travel is blocked by the closed gate X.

The pull of the clamp conveyor chain which is transmitted to the clamp C through its associated slip clutch advances the clamp C idly along the track at the linear speed of the clamp propelling chain 154 ahead of the clamp B.

Figure 29:
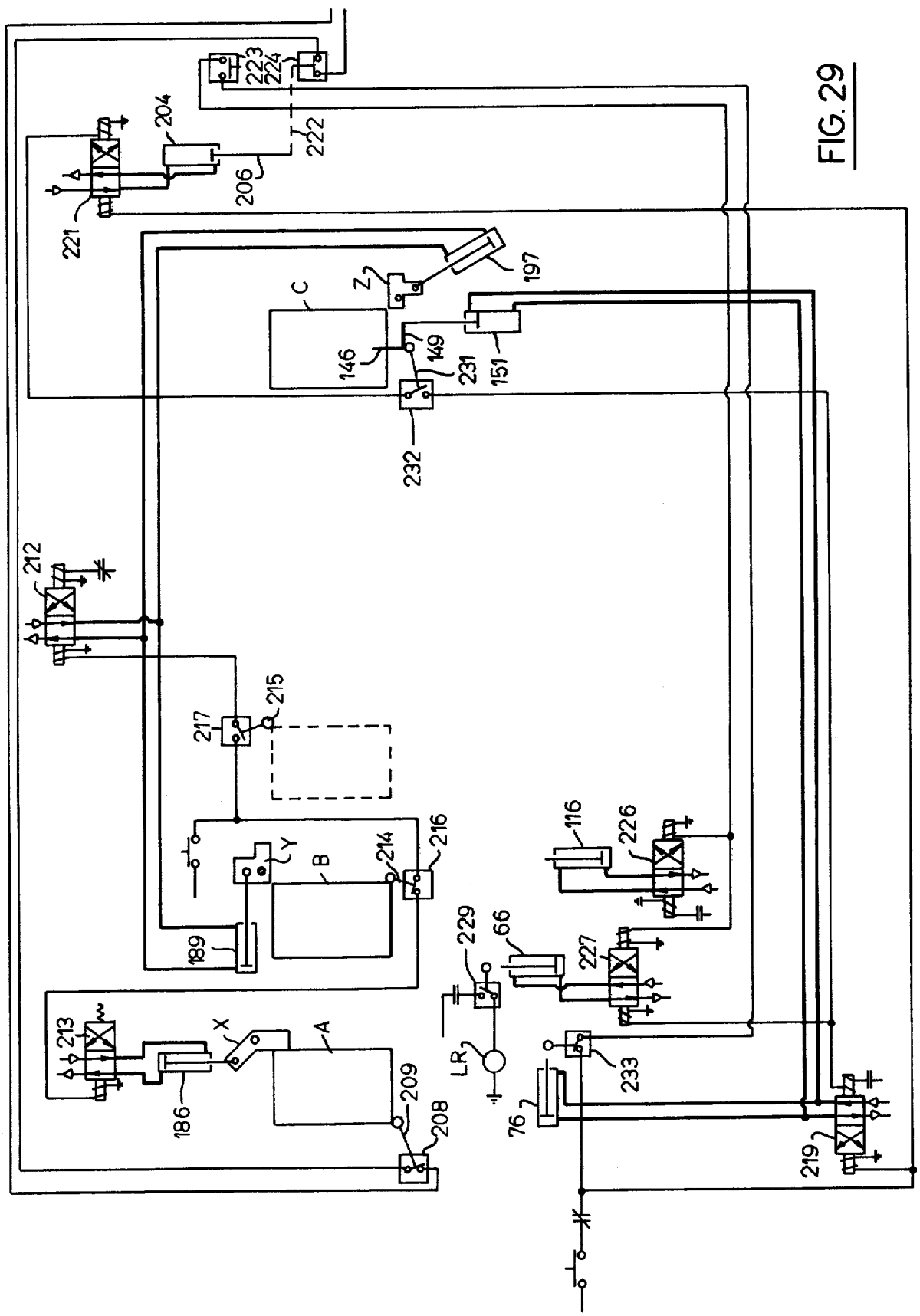
FIG. 29 is a circuit diagram of an electro-pneumatic control arrangement for the wire transfer system shown in FIG. 7.

The circuit diagram of FIG. 29 schematically shows the clamps A, B and C, and the gates X, Y, Z in the same relation to each other in which they are shown in FIG. 23, and the circuit diagram also shows components of an electro-pneumatic control system for the gates and for other units of the wire transfer system in conditions of adjustment corresponding to the FIG. 23 starting condition.

The actuating cylinder 189 (FIG. 8) for the gate Y as shown in FIG. 29 is pneumatically connected to a fourway solenoid valve 212. Also connected to the solenoid valve 212, and in parallel with the cylinder 189, is the actuating cylinder 197 (FIG. 8) for the gate Z. In the FIG. 23 starting condition, the solenoid valve 212 admits air pressure to the gland ends of the cylinder 189 and cylinder 197, causing these cylinders to contract and to keep the gates Y and Z open.

The actuating cylinder 186 (FIG. 7) for the gate X is pneumatically connected to a fourway solenoid valve 213 which in the starting condition of the system directs air pressure to the gland end of the cylinder 186 causing that cylinder to contract and keep the gate X closed.

FIG. 24 illustrates the condition of the wire transfer system after an initial advance travel of the clamp B from its FIG. 23 position to an intermediate position between the gates Y and Z. While the clamp B is in its FIG. 23 position it cooperates with a bell crank lever 214 (FIGS. 7 and 8) to close an on-off switch 216 mounted on the apparatus frame. Upon advancement of the clamp B from its FIG. 23 position it clears the bell crank lever 214 and thereby causes the switch 216 to open. As shown in FIG. 29, the switch 216 is connected to the fourway solenoid valve 213 which, as stated, is pneumatically connected to the control cylinder 186 (FIG. 7) for the gate X. Opening of switch 216 causes gate X to open, as shown in FIG. 24, and thereby clear the path of travel of clamp A along the track stretch 122. As soon as gate X has been opened, pull of the clamp propelling chain 154 which is transmitted to the clamp A through its associated slip clutch advances that clamp at the linear speed of the clamp conveyor chain 154 behind the advancing clamp B.

As further shown in FIG. 24, advance of clamp A has opened the monitor switch 208 which, as shown in FIG. 29, is connected in series with a switch 224 (FIG. 7) and whose function will be explained later.

Arrival of clamp B at its FIG. 24 intermediate position between the gates Y and Z has further closed a switch 217 (FIG. 7) by means of a bell crank lever 215 which operates like the bell crank lever 214. The switch 217 is connected, as shown in FIG. 29, with the fourway valve 212 which, as mentioned, is pneumatically connected to the actuating cylinger 189 for the gate Y and to the actuating cylinder 197 for the gate Z. Closing of the switch 217 causes simultaneous closing of gates Y and Z, as shown in FIG. 24.

FIG. 25 illustrates the condition of the wire transfer system at the moment when the desired wire length has been measured by the measuring unit 2 and the measured wire length has been advanced into the wire transfer system by the propelling rollers of the feeding unit 1. At that moment the clamp B has advanced from its FIG. 24 intermediate position to a wire stock tensioning position at a short distance from the closed gate Z. The clamp A has advanced from its FIG. 24 position against the closed gate Y; and the clamp C has been propelled by the continuously running clamp propelling chain 154 around the semi-circular front end 126 of the track 121 to an intermediate position on the upper track stretch 123 between the front and rear ends of the track. Advance travel of the clamp A from its FIG. 24 to its FIG. 25 position has reclosed the switch 216, and as a result the gate X is closed before the clamp C arrives at the rear end of the track.

At the moment when the desired conductor length has been measured by the meeasuring device and has been advanced into the wire transfer system by the propelling rollers of the feeding unit, rotation of the propelling rollers of the wire feeding device is stopped by an actuating impulse which is emitted from the measuring device when it has measured a length of wire stock having the desired conductor length. The stopped propelling rollers of the feeding device, as stated, lock the wire stock against lengthwise displacement.

FIG. 26 illustrates the condition of the wire transfer system at a moment shortly after the actuating impulse has been emitted by the measuring unit. At that moment the clamp C has advanced from its FIG. 25 position on the track stretch 123 toward the rear end of the track, and the closed jaws of the clamp B have been lowered from their raised FIG. 25 position into a lowered wire depositing position at the gate Z. Further, the open jaws of the clamp A at the gate Y have been closed and lowered in unison with the closed jaws of the clamp B; and the wire cutting mechanism 3 has been projected from its retracted FIG. 23 position next to a projected position next to the chain 77 of the wire conveying mechanism 4.

The change of the wire transfer system from the FIG. 25 condition to the FIG. 26 condition is initiated by the same actuating impulse which is emitted by the measuring unit to stop rotation of the propelling rollers of the feeding unit. In effect, when said impulse is transmitted to the feeding unit, it is simultaneously transmitted to fourway solenoid valves 219 and 221 shown in FIG. 29. The valve 219 is pneumatically connected to the actuating cylinder 151 (FIG. 11) for the clamp cocking arm 146, and to the shift cylinder 76 (FIG. 2) for the cutting mechanism. On the other hand, the solenoid valve 221 is pneumatically connected to the actuating cylinder 204 (FIG. 9) for the clamp control shaft 201.

Shift of the valve 219 (FIG. 29) in response to the actuating impulse from the measuring unit causes contraction of the clamp cocking cylinder 151 (FIG. 11) and simultaneous expansion of the shift cylinder 76 (FIG. 2) for the cutting mechanism. Contraction of the cylinder 151 (FIG. 11) swings the clamp cocking arm 146 (FIG. 11) into a lowered inoperative position (FIG. 11), and expansion of the cylinder 76 projects the open cutter assembly (FIG. 12) into its operating position next to the chain 77 of the wire conveying mechanism as shown in FIG. 26.

Shift of the solenoid valve 221 (FIG. 29) in response to the actuating impulse from the measuring unit adjusts the cylinder 204 from its expanded FIG. 9 condition to its contracted FIG. 10 condition. In its expanded FIG. 9 condition the cylinder 204 maintains the clamp control shaft 201 in an inoperative position in which its clamp actuating bar 202 and the clamp trip cam 144 are raised. Initial contraction of the cylinder 204 and consequent initial turning of the clamp control shaft causes the trip cam 144 of the shaft 201 to disengage the trigger 141 (FIG. 21) of the open and raised jaws of clamp A (FIG. 25) which is kept at standstill by the closed gate Y. Disengagement of the trigger causes the raised jaws 133, 136 of clamp A to close. Continued turning of the clamp control shaft 201 by the contracting cylinder 204 brings the clamp actuating bar 202 of the control shaft 201 into engagement with the raised jaw 133 of clamp A and with the jaw 133 of the closed and raised clamp B which is kept at standstill by the tensioned wire stock (FIG. 25). As the clamp actuating bar 202 swings into its fully lowered position (FIG. 10) by contraction of the cylinder 204, the bar 202 pushes the closed jaws of clamps A and B from their raised FIG. 25 position into their lowered FIG. 26 positions. The lowering of clamps A and B into the FIG. 26 position lowers the wire stock into a registering pair of indexed open wire gripping clamps 83 of the wire propelling chains 77 and 78.

FIG. 27 illustrates the condition of the wire transfer system at a moment shortly after the uncut wire stock has been lowered as illustrated by FIG. 26. As shown in FIG. 11, the clamp control shaft 201 mounts an actuating finger 222 for the mentioned switch 224 and for another switch 223, these switches, as shown in FIG. 7, being mounted on the apparatus frame near the front end of the endless track 121. In the FIG. 27 condition of the wire transfer system, the switch 223 (FIG. 11) has been closed by swinging movement of the clamp control shaft 201 into its operative clamp lowering position (FIG. 10) in response to full contraction of the cylinder 204. The switch 223, as shown in FIG. 29, controls two fourway solenoid valves 226 and 227. The valve 226 is pneumatically connected to the actuating cylinder 116 (FIG. 17) for the gripping clamps 83 on the conveyor chains 77, 78; and the valve 227 is pneumatically connected to the actuating cylinder 66 (FIG. 12) of the wire cutting blade assemblies 63 and 64. Shifting of the valve 226 in response to closing of the switch 223 causes closing of the indexed pair of conveyor clamps 83 into which the wire stock has been deposited by lowering of the closed jaws of clamp A and B as shown in FIG. 26. At the same time shifting of the valve 227 has closed the cutting blades of the cutting mechanism 3 and has thereby severed the wire stock, as shown in FIG. 27, at a short distance ahead of the lowered and closed clamp A while that clamp is kept at standstill by the closed gate Y and while the wire stock is tensioned in its FIG. 26 condition by the pull of the clamp propelling chain 154 (FIG. 8) upon the clamp B.

As shown in FIG. 12, an actuating arm 228 for a switch 229 is operatively connected to the lever 71 of the cutting mechanism. Expansion of the cutting cylinder 66 closes the cutting blades and thereafter closes the switch 229 by the actuating arm 228. As indicated in FIG. 29, a latch relay LR is operated by the switch 229 to energize the solenoid valve 227 and cause the actuating cylinder 66 of the cutting blades to contract and thereby open the cutting blades immediately after they have completed a cutting stroke.

The latch relay LR also energizes the solenoid valve 219 so that it will admit air pressure to the barrel end of the actuating cylinder 151 of the clamap cocking arm 146 (FIG. 11). The resulting expansion of the cylinder 151 causes the closed lowered gripping jaws 133, 136 of the clamp B (FIG. 27) to be opened. Thereafter, the jaws 133, 136 of clamp B will stay open due to the latching of the jaw 136 by the trigger 141 (FIG. 21).

The latch relay LR also energizes the solenoid valve 219 so that it will admit air pressure to the gland end of the cylinder 76, thereby causing contraction of that cylinder and consequent retraction of the cutting mechanism from its projected FIG. 26 position to its retracted FIG. 25 position.

Accordingly, in the FIG. 27 condition of the wire transfer system the severed wire length 82 is released from clamp A and firmly gripped by the closed and lowered jaws of the clamp A.

Due to the tensioning of the wire stock by the pull of clamp B prior to the cutting stroke of the cutting mechanism the severed, accurately measured wire length 82 extends between the pair of indexed conveyor clamps 83 practically without any catenary sag after the conveyor clamps have been closed and after the wire length 82 has been severed from the remaining wire stock which is firmly gripped by the jaws of the clamp

A.

FIG. 28 illustrates the condition of the wire transfer system at a moment shortly after the lowered closed jaws of the clamp B have been opened by upward swing of the clamp cocking lever 146 (FIG. 11) in response to expansion of the cylinder 151. As shown in FIG. 11, an actuating arm 231 is secured to the arm 149, and upward swinging of the clamp cocking arm 149 and coincident upward swinging of arm 146 closes a switch 232 on the adjustable side frame section 81. As shown in FIG. 29 the switch 232 is connected to one of the solenoid coils of the valve 221. As a result of the closing of switch 232 the valve 221 is shifted into a position in which it admits air pressure to the barrel end of the cylinder 204, and the resulting expansion of the cylinder 204 will swing the clamp control shaft to its FIG. 9 inoperative position. The open jaws of the clamp B and the closed jaws of the clamp A will therefore rise under the expanding pressures of their associated lift springs 134 (FIG. 21) to the elevated positions in which they are shown in FIG. 28. While the clamps B and A are restrained by the closed gates Z and Y, the clamp C has moved from its FIG. 27 position to its FIG. 28 position in which the clamp C abuts the closed gate X and in which the clamp C has also reclosed the monitor switch 208.

When the cutting mechanism has completed a cutting stroke it is adjusted from its projected FIG. 26 position to its retracted FIG. 27 position by contraction of the cylinder 76 in response to the closing of switch 229. Back and forth movement of the cutting mechanism between its projected and retracted positions actuates a switch 233 to signal the projected position of the cutting mechanism preparatory to the cutting operation.

When the wire has been cut and after the cutting mechanism has been adjusted to its retracted position and the clamps A and B have been adjusted to their raised positions as shown in FIG. 28, the conveyor drive mechanism 105 (FIG. 2) and associated indexing mechanism (not shown) are actuated to advance the conveying mechanism 4 one step and thereby present a new pair of registering clamps 83 on the conveyor chains 77 and 78 to the wire transfer system for delivery of another wire length 82 thereto. While the conveying mechanism advances, the end of the cut wire adjacent to the cutting mechanism will clear the latter because of the previous withdrawal of the cutting mechanism from its projected FIG. 26 position to its retracted FIG. 27 position.

The expansion of the cylinder 204 which swings the clamp control bar 202 to its FIG. 9 position also swings the actuating finger 222 (FIG. 11) out of engagement with the switch 223 and into engagement with the switch 224. The switch 223 will therefore be opened and the switch 224 will be closed while the wire transfer system is in the FIG. 28 condition. As a result of the opening of switch 223 and of the closing of switch 224 the conveying mechanism 4 is indexed through suitable circuitry, not shown, and the wire transfer system will then be ready to perform another operating cycle beginning with a starting condition corresponding to FIG. 23. The monitor switch 208 controls the feeding mechanism 1 so as to prevent it from starting a new wire feeding cycle until the wire transfer system has been restored to a starting position corresponding to FIG. 23.

The starting condition of the wire transfer system for the second operating cycle will be different, however, from the starting condition illustrated by FIG. 23 in that at the start of the second operating cycle the clamp C will be stopped by the closed holding gate X; the clamp A will be positioned at the open starting gate Y, and the clamp B will be positioned at the open intercepting gate Z.

At the start of the third operating cycle the clamp B will be stopped by the closed holding gate X, the clamp C will be positioned at the open starting gate Y and the clamp A will be positioned at the open intercepting gate Z.

At the start of the fourth operating cycle the clamps A, B and C will again be positioned as shown in FIG. 23.

Stated differently, the first operating cycle of the apparatus will start with the clamp B tensioning the wire stock which is advanced by the feeding unit; the second operating cycle will start with the clamp A tensioning the advancing wire stock; the third operating cycle will start with the clamp C tensioning the advancing wire stock; and the fourth operating cycle will start with the clamp B again tensioning the advancing wire stock as illustrated by FIG. 23.

Each operating cycle of the apparatus involves the following phases:

A first phase in which supply wire is fed lengthwise on an input level through a cutting zone from one side of the latter and is simultaneously guided lengthwise away from the other side of said cutting zone; in the embodiment of the invention, as illustrated by FIGS. 23–28, the input level is the level on which the supply wire 43 is shown in FIGS. 23–27, and the cutting zone is the zone of the cutting blade assemblies 63, 64 (FIG. 13);

a second phase, as illustrated by FIG. 25, in which the supply wire is stopped from advancing on the input level and is locked against lengthwise displacement after a measured length thereof has been advanced through the cutting zone;

a third phase, as illustrated by FIG. 25, in which the measured length of the locked supply wire is tensioned;

a fourth phase as illustrated by FIG. 26 in which the locked and tensioned supply wire at opposite sides of the cutting zone is aligned with an output level spaced transversely from the input level;

a fifth phase, as illustrated by FIG. 27, in which the tensioned supply wire on the output level is clamped to a wire propelling mechanism at said other side of the cutting zone and in which the tensioned supply wire is severed on said output level at the cutting zone;

a sixth phase, as illustrated by FIG. 28, in which the remaining portion of the supply wire is realigned with the input level; and a seventh phase, as discussed in connection with FIG. 28, in which the wire conveying mechanism is indexed so as to move the severed length of the supply wire on the output level sidewise at said other side of the cutting zone.

The time which elapses from the moment at which the propelling rollers of the feeding unit start rotating until the moment at which the monitor switch 208 is reclosed may be designated as the cycling time of the apparatus. That time will, of course, be relatively short when the measuring device is adjusted to stop the feeding unit after it has measured only a relatively short length of wire stock; and conversely, the cycling time will be relatively long when the measuring unit is adjusted to stop the feeding unit after it has measured a relatively long length of wire stock. In each case, however, only a relatively short delay will occur from the moment the wire is cut (FIG. 27) until the monitor switch is reclosed (FIG. 28), because the clamp which causes such reclosing of the monitor switch has already advanced a substantial distance toward the monitor switch during the portion of the cycling time preceding the cutting of the wire stock. If the apparatus is operated to produce conductors of maximum length the delay between the cutting of the wire stock and the reclosing of the monitor switch will be a minimum, and if the apparatus is operated to produce conductors of minimum length the delay between the cutting of the wire stock and the reclosing of the monitor switch will be a maximum.

Figure 30:
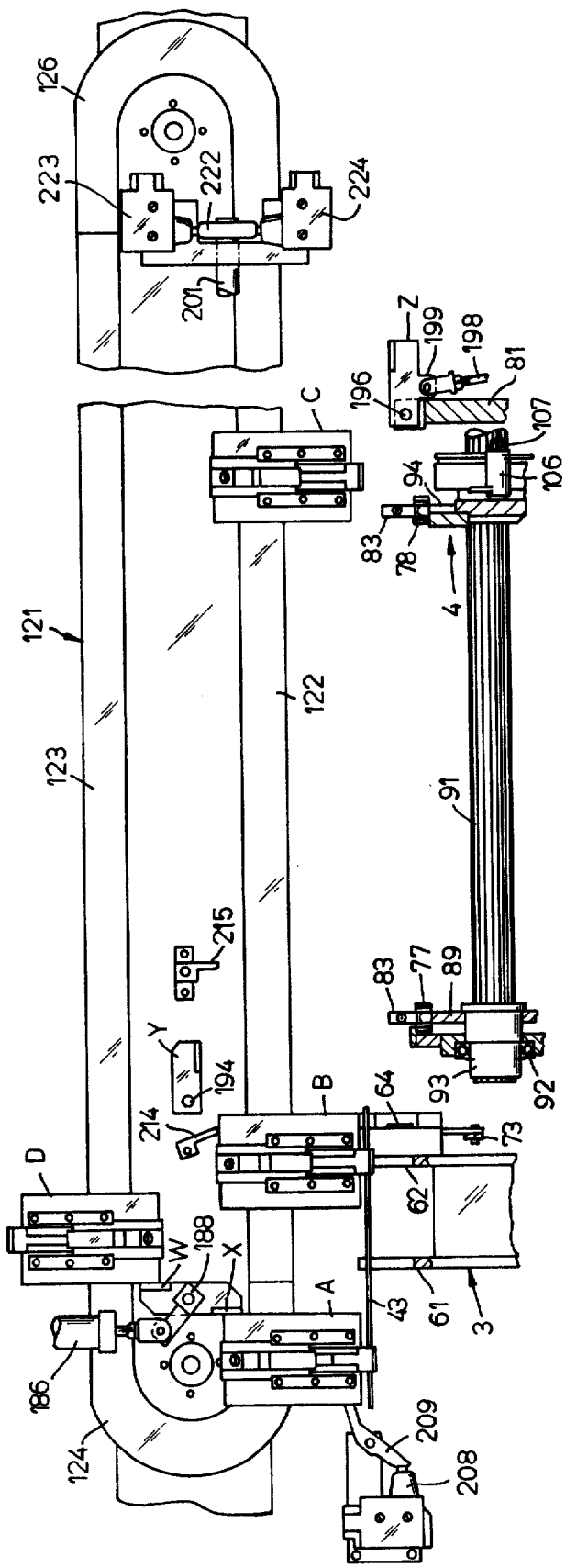
FIG. 30 is a schematic view similar to FIG. 23 but illustrating a modification of the wire transfer system shown in FIG. 7.

In order to shorten the delay between the cutting of the wire stock and the reclosing of the monitor switch and thereby further reduce the cycling time of the apparatus for producing conductors of minimum, maximum or any intermediate length, the hereinbefore disclosed apparatus using three wire clamps A, B and C and gates X, Y and Z, may be provided with a fourth clamp D and with a fourth gate W as shown by FIG. 30.

The fourth clamp D is constructed like the clamps A, B, C and as shown in FIGS. 20–22, and the clamp D is connected to the clamp propelling chain 154 by a slip clutch in the same manner in which each of the clamps A, B and C are connected to that chain. The gate W is an opposite hand duplicate of the gate X and it is connected to the actuating mechanism for the gate X in such a manner that closing of the gate X to block forward clamp travel on the lower track stretch 122 and closing of the gate W to block rearward clamp travel on the upper track stretch 123 will take place at the same time, and so that opening of the gates X and W will similarly take place at the same time. Due to the provision of the fourth clamp D and fourth gate W the delay between the cutting of the wire stock and the reclosing of the monitor switch 208 will be reduced to the period of clamp travel from the open gate W around the rear end of the track to the monitor switch 208.

We claim:

1. An apparatus for producing electrical conductors of measured length from a continuous supply wire, comprising:
    a frame;
    an endless elongated track mounted on said frame in a fixed position presenting laterally spaced track stretches extending between front and rear ends thereof;
    a plurality of wire transfer clamps movable in series around said track and each comprising a pair of complementary wire gripping jaws adjustable to closed and open positions;
    drive means for intermittently and successively circulating said clamps forwardly along one of said track stretches and rearwardly along the other;
    a clamp holding gate at the rear end of said track;
    a clamp starting gate spaced forwardly from said holding gate along said one track stretch;
    a clamp intercepting gate spaced forwardly of said starting gate along said one track stretch;
    control means for said wire gripping jaws of said clamps and for said holding, starting and intercepting gates operable in timed relation to each other so that one of said clamps will advance a leading end of said supply wire from said starting gate toward said intercepting gate while another of said clamps advances idly from said intercepting gate toward said holding gate, and still another of said clamps advances idly from said holding gate toward said starting gate; and
    wire cutting means operable after said leading end of said supply wire has been advanced to said intercepting gate to sever said supply wire between said starting and intercepting gates in proximity to said starting gate.

2. An apparatus as set forth in claim 1 and further comprising an auxiliary clamp holding gate operable to delay advance movement of successive wire transfer clamps to said first mentioned holding gate.

3. An apparatus as set forth in claim 1, wherein said complementary wire gripping jaws of each of said wire transfer clamps are bodily reciprocable transversely of said track to inwardly retracted and outwardly projected positions, and wherein said control means are operable so that the clamp which has been moved to said intercepting gate and the clamp which has been moved from said holding gate to said starting gate will be adjusted from their retracted to their projected positions while in gripping engagement with said supply wire.

4. An apparatus for producing electrical conductors of measured length from a continuous supply wire comprising:
    a frame having a main section and two parallel side sections, one fixedly connected to said main section in transversely extending relation thereto and the other adjustably connected to said main section in laterally back and forth adjustable relation to said fixed side section;
    a wire propelling conveyor comprising a pair of transversely spaced endless conveyor chains operatively mounted, respectively, on said frame side sections and each provided with wire gripping clamps selectively adjustable to wire gripping and wire releasing positions;
    an endless elongated track mounted on said main section of said frame to extend lengthwise thereof in a forward direction across and above said conveyor chains and presenting laterally spaced track stretches between its front and rear ends;
    a plurality of wire transfer clamps movable in series around said track and each comprising a pair of complementary wire gripping jaws adjustable to closed and open positions and bodily reciprocable transversely of said track;
    drive means for intermittently and successively circulating said wire transfer clamps forwardly along one of said track stretches and rearwardly along the other;
    a clamp holding gate mounted on said main section of said frame at the rear end of said track;
    a clamp starting gate on said main section of said frame spaced forwardly from said holding gate along said one track stretch;
    a clamp intercepting gate mounted on said adjustable side section of said frame at a forward spacing from said starting gate along said one track stretch;
    control means for said gripping jaws of said wire transfer clamps and for said holding, starting and intercepting gates operable in timed relation to each other so that one of said wire transfer clamps will advance a leading end of said supply wire from said starting gate toward said intercepting gate and lower it there upon an indexed wire gripping clamp of the conveyor chain of said adjustable side section of said frame; so that another of said wire transfer clamps at said starting gate will lower a portion of said supply wire upon an indexed wire gripping clamp of the conveyor chain of said fixed side section of said main frame, and so that still another of said wire transfer clamps will advance idly from said intercepting gate toward said holding gate;

control means for said wire gripping clamps of said conveyor chains operable in timed relation to said wire gripping jaws of said wire transfer clamps so as to close said indexed wire gripping clamps of said conveyor chains of said fixed and adjustable frame side sections after said supply wire has been lowered thereupon; and wire cutting means operable to sever said lowered supply wire in proximity to said starting gate while it is engaged by said indexed and closed wire gripping clamps of said conveyor chains.

5. An apparatus as set forth in claim 4, wherein control means for said wire transfer clamps and for said holding and starting gates are operatively mounted on said main section of said frame; and wherein control means for said wire transfer clamps and for said clamp intercepting gate are operatively mounted on said adjustable side section of said frame.

6. An apparatus as set forth in claim 5 wherein each of said wire transfer clamps comprises a base section slidably guided on said endless track for movement therealong, a wire gripping jaw reciprocable on said base section transversely of said track, and a complementary wire gripping jaw pivotally mounted on said reciprocable gripping jaw; wherein said base section of each of said transfer clamps is successively engageable by said holding, starting and intercepting clamps; and wherein said control means for said wire transfer clamps are selectively engageable with said reciprocable and pivoted wire gripping jaws of said wire transfer clamps.

7. An apparatus as set forth in claim 4 wherein said drive means for said wire transfer clamps comprise an endless clamp propelling chain trained about driving and driven sprocket wheels at the opposite ends of said endless track, and a yieldable draft transmitting connection between said clamp propelling chain and each of said wire transfer clamps.

8. An apparatus as set forth in claim 4 wherein said drive means for said wire transfer clamps comprise an endless clamp propelling chain trained about driving and driven sprocket wheels at the opposite ends of said endless track, a rotatable sprocket wheel on each of said wire transfer clamps in mesh with said clamp propelling chain, and a torque transmitting friction clutch between each of said wire transfer clamps and its associated sprocket wheel.

9. An apparatus as set forth in claim 4, wherein said wire cutting means are shiftably mounted and controlled so that they will be in a projected position close to said wire propelling conveyor while the latter is at standstill, and so that said wire cutting means will be in a retracted position away from said wire propelling conveyor when the latter is in motion.

* * * * *